US012738635B2

(12) United States Patent
Shriner et al.

(10) Patent No.: US 12,738,635 B2
(45) Date of Patent: Sep. 15, 2026

(54) ANTENNA DESIGNS FOR HEARING INSTRUMENTS

(71) Applicant: Starkey Laboratories, Inc., Eden Prairie, MN (US)

(72) Inventors: Paul Anders Shriner, Hopkins, MN (US); Ezdeen Elghannai, Eden Prairie, MN (US); Carter Christensen, Prior Lake, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 276 days.

(21) Appl. No.: 18/355,242

(22) Filed: Jul. 19, 2023

(65) Prior Publication Data

US 2024/0030592 A1 Jan. 25, 2024

Related U.S. Application Data

(60) Provisional application No. 63/368,930, filed on Jul. 20, 2022.

(51) Int. Cl.

| | |
|---|---|
| ***H01Q 1/27*** | (2006.01) |
| ***H01Q 1/36*** | (2006.01) |
| ***H04R 25/00*** | (2006.01) |

(52) U.S. Cl.

CPC ............... *H01Q 1/273* (2013.01); *H01Q 1/36* (2013.01); *H04R 25/554* (2013.01); *H04R 25/609* (2019.05); *H04R 2225/51* (2013.01); *H04R 2225/57* (2019.05)

(58) Field of Classification Search

CPC ............ H01Q 1/24; H01Q 1/241; H01Q 1/27; H01Q 1/273; H01Q 1/36; H01Q 5/371; H01Q 5/48; H01Q 9/285; H01Q 9/30; H04R 25/60; H04R 25/554; H04R 25/609;

(Continued)

(56) References Cited

U.S. PATENT DOCUMENTS

| | | | |
|---|---|---|---|
| 9,237,404 | B2 | 1/2016 | Ozden et al. |
| 9,237,405 | B2 | 1/2016 | Pinto |
| 9,293,814 | B2 | 3/2016 | Ozden |

(Continued)

OTHER PUBLICATIONS

Dushyantt Garg and Shweta Srivastava, "Multi band compact bow-tie slot antenna for WLAN applications," Electromagnetic Compatibility (APEMC), 2012 Asia-Pacific Symposium On, IEEE, May 21, 2012 (May 21, 2012), pp. 597-600 (Year: 2012).*

(Continued)

*Primary Examiner* — Thai Pham

(74) *Attorney, Agent, or Firm* — Shumaker & Sieffert, P.A.

(57) ABSTRACT

An antenna for a hearing instrument comprises: a first antenna portion comprising a first body and at least one of a first set of anterior arms extending in an anterior direction from the first body, or a first set of posterior arms extending in a posterior direction from the first body; a second antenna portion comprising a second body and at least one of a second set of anterior arms extending in the anterior direction from the second body, or a second set of posterior arms extending in a posterior direction from the second body, each arm of the first and second sets of anterior arms and each arm of the first and second sets of posterior arms having a physical length at least 10% of a total physical length of the first and second antenna portions, respectively.

16 Claims, 11 Drawing Sheets

(58) Field of Classification Search
CPC ............ H04R 2225/51; H04R 2225/57; H04R 2225/021
See application file for complete search history.

(56) References Cited

U.S. PATENT DOCUMENTS

| | | | | |
|---|---|---|---|---|
| 9,369,813 | B2 | 6/2016 | Kvist | |
| 9,402,141 | B2 | 7/2016 | Kvist | |
| 9,408,003 | B2 | 8/2016 | Kvist | |
| 9,686,621 | B2 | 6/2017 | Akdeniz et al. | |
| 9,883,295 | B2 | 1/2018 | Akdeniz et al. | |
| 9,980,062 | B2 | 5/2018 | Fischer et al. | |
| 10,743,116 | B2 | 8/2020 | Rabel | |
| 2016/0050502 | A1* | 2/2016 | Kvist | H04R 25/554 381/315 |
| 2016/0330552 | A1* | 11/2016 | Flood | H01Q 9/28 |
| 2018/0115055 | A1* | 4/2018 | Hosadurga | H04R 25/554 |
| 2019/0098420 | A1* | 3/2019 | Elghannai | H04R 25/60 |
| 2019/0191256 | A1* | 6/2019 | Kvist | H04R 25/60 |
| 2019/0373381 | A1* | 12/2019 | Elghannai | H01Q 1/241 |
| 2020/0053489 | A1* | 2/2020 | Shriner | H04B 1/385 |
| 2020/0186947 | A1* | 6/2020 | Prabhu | H04R 25/554 |

OTHER PUBLICATIONS

Garg et al., "Multi Band Compact Bow-Tie Slot Antenna for WLAN Applications", 2012 Asia-Pacific Symposium on Electromagnetic Compatibility, May 21, 2012, pp. 597-600.

International Search Report and Written Opinion of International Application No. PCT/US2023/070584 dated Oct. 24, 2023, 11 pp.

* cited by examiner

ANTENNA DESIGNS FOR HEARING INSTRUMENTS

This application claims the benefit of U.S. Provisional Patent Application 63/368,930, filed Jul. 20, 2022, the entire content of which is incorporated by reference.

TECHNICAL FIELD

This disclosure relates to antennas for hearing instruments.

BACKGROUND

Wearable devices are devices designed to be worn on, in, or near one or more of a user's body. Example types of wearable device may include hearing instruments, smart watches, on-body biometric sensors, media players, augmented or virtual reality headwear, and so on. Hearing instruments are wearable devices designed to be worn on, in, or near one or more of a user's ears. Common types of hearing instruments include hearing assistance devices (e.g., "hearing aids"), earbuds, headphones, hearables, cochlear implants, and so on. In some examples, a hearing instrument may be implanted or integrated into a user. Some hearing instruments include additional features beyond sound-amplification. For example, some modern hearing instruments include advanced audio processing for improved device functionality, controlling and programming the devices, and beamforming, and some can even communicate wirelessly with external devices including other hearing instruments (e.g., for streaming media).

SUMMARY

This disclosure describes antenna designs for hearing instruments. As described in this disclosure, an antenna for a hearing instrument includes a first antenna portion and a second antenna portion. The first antenna portion comprises a first body. The first antenna portion further comprises a first set of two or more anterior arms extending in an anterior direction from the first body and/or a first set of two or more posterior arms extending in a posterior direction from the first body. The second antenna portion comprises a second body. The second antenna portion further comprises a second set of two or more anterior arms extending in the anterior direction from the second body and/or a second set of two or more posterior arms extending in the posterior direction from the second body. Each arm of the first set of anterior arms and each arm of the first set of posterior arms may have a physical length at least 10% of a total physical length of the first antenna portion. Each arm of the second set of anterior arms and each arm of the second set of posterior arms may have a physical length at least 10% of a total physical length of the second antenna portion. The antenna may also comprise a strap member that connects inferior edges of the first antenna portion and the second antenna portion. The antenna may further comprise a first feed line extending from a superior edge of the first antenna portion and a second feed line extending from a superior edge of the second antenna portion.

In one example, this disclosure describes an antenna for a hearing instrument, the antenna comprising: a first antenna portion comprising a first body, wherein the first antenna portion further comprises at least one of: a first set of two or more anterior arms extending in an anterior direction from the first body, each arm of the first set of anterior arms having a physical length at least 10% of a total physical length of the first antenna portion, or a first set of two or more posterior arms extending in a posterior direction from the first body, each arm of the first set of posterior arms having a physical length at least 10% of a total physical length of the first antenna portion; a second antenna portion comprising a second body, wherein the second antenna portion further comprises at least one of: a second set of two or more anterior arms extending in the anterior direction from the second body, each arm of the second set of anterior arms having a physical length at least 10% of a total physical length of the second antenna portion, or a second set of two or more posterior arms extending in the posterior direction from the second body, each arm of the second set of posterior arms having a physical length at least 10% of a total physical length of the second antenna portion; a first feed line extending from an edge (e.g., a superior edge) of the first antenna portion; and a second feed line extending from an edge (e.g., a superior edge) of the second antenna portion.

In another example, this disclosure describes an antenna for a hearing instrument, the antenna comprising: a first antenna portion comprising a first body, wherein the first antenna portion further comprises at least one of: a set of two or more anterior arms extending in an anterior direction from the first body, each arm of the set of anterior arms having a physical length at least 10% of a total physical length of the first antenna portion, or a set of two or more posterior arms extending in a posterior direction from the first body, each arm of the set of posterior arms having a physical length at least 10% of a total physical length of the first antenna portion; a second antenna portion comprising a second body, wherein the first antenna portion and the second antenna portion are configured to be on opposite sides of the hearing instrument; a strap member that connects a first edge of the first antenna portion to a first edge of the second antenna portion; a first feed line extending from a second edge of the first antenna portion; and a second feed line extending from a second edge of the second antenna portion.

In another example, this disclosure describes a hearing instrument that may include an antenna in accordance with any of the examples of this disclosure.

In another example, this disclosure describes a hearing instrument comprising: a wireless transceiver; and an antenna that comprises: a first antenna portion comprising a first body, wherein the first antenna portion further comprises at least one of: a first set of two or more anterior arms extending in an anterior direction from the first body, each arm of the first set of anterior arms having a physical length at least 10% of a total physical length of the first antenna portion, or a first set of two or more posterior arms extending in a posterior direction from the first body, each arm of the first set of posterior arms having a physical length at least 10% of a total physical length of the first antenna portion; a second antenna portion comprising a second body, wherein the second antenna portion further comprises at least one of: a second set of two or more anterior arms extending in the anterior direction from the second body, each arm of the second set of anterior arms having a physical length at least 10% of a total physical length of the second antenna portion, or a second set of two or more posterior arms extending in the posterior direction from the second body, each arm of the second set of posterior arms having a physical length at least 10% of a total physical length of the second antenna portion; a first feed line connected to the wireless transceiver and extending from an edge of the first antenna portion; and a second feed line connected to the wireless transceiver and extending from an edge of the second antenna portion.

The details of one or more aspects of the disclosure are set forth in the accompanying drawings and the description below. Other features, objects, and advantages of the features and techniques described in this disclosure will be apparent from the description, drawings, and claims.

DETAILED DESCRIPTION

Figure 1:
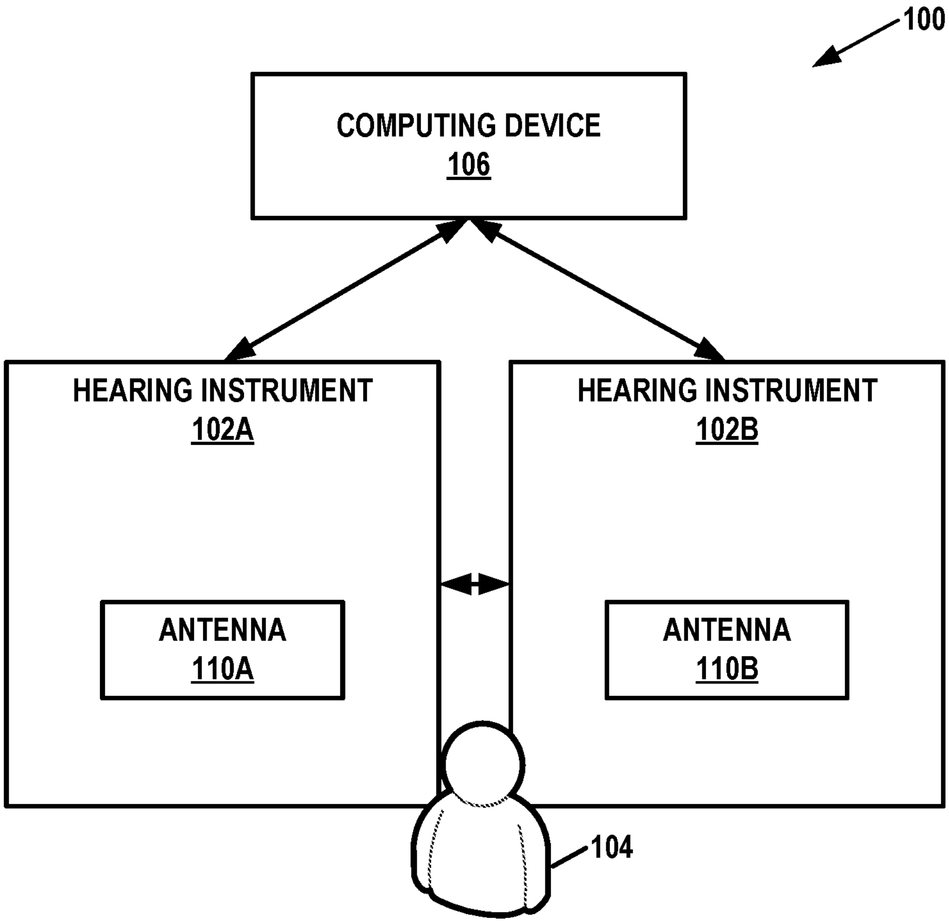
FIG. 1 is a block diagram illustrating an example system that includes one or more hearing instrument(s), in accordance with one or more aspects this disclosure.

Wireless communication links are becoming an increasingly important aspect of wearable devices, such as hearing instruments. Although much of this disclosure describes hearing instruments, the antennas and antenna designs of this disclosure may be used in other types of wearable devices that include wireless capabilities. A hearing instrument may use wireless communication links to communicate with other hearing instruments or with other types of devices, such as mobile phones or hearing instrument accessories. Such communication may serve a wide variety of purposes, such as streaming media data and sending sensor data.

A hearing instrument may include an antenna to perform wireless communication. In part because of the small sizes of hearing instruments and the limited storage capacities of the batteries of hearing instruments, designing antennas for hearing instruments is challenging. For example, it may be challenging to design an antenna for a hearing instrument that has high performance for two or more of ear-to-ear communication, on-body communication, and off-body communication. Moreover, it may be impractical because of the size and cosmetic constraints of a hearing instrument for the hearing instrument to include multiple antennas for different types of wireless communication. In this disclosure, ear-to-ear communication is wireless communication between hearing instruments worn in different ears of a user. On-body communication may include wireless communication with device that are on the body of a user of the hearing instrument, such as smartphones, smartwatches, wearable devices, on-body sensor devices, and so on. Off-body communication may include wireless communication with devices other than hearing instruments that are not on the user's body, such as accessory devices, Internet of Things (IoT) devices, wireless base stations, and so on.

This disclosure describes antenna designs that may increase, maintained, or reduce degradation of the performance of a hearing instrument for communication, such as ear-to-ear communication, on-body communication, and off-body communication. For instance, in one example, this disclosure describes an antenna for a hearing instrument. The antenna is configured to send and receive data. The antenna includes a first antenna portion and a second antenna portion. The first and second antenna portions may be on opposite sides of the hearing instrument and various components of the hearing instrument, such as electronic components, microphones, a receiver, and so on. The first antenna portion comprises a first body. The first antenna portion further comprises at least one of: a first set of two or more anterior arms extending in an anterior direction from the first body, or a first set of two or more posterior arms extending in a posterior direction from the first body. Each arm of the first set of anterior arms and each arm of the first set of posterior arms has a physical length at least 10% of a total physical length of the first antenna portion. The antenna also includes a second antenna portion that comprises a second body. The second antenna portion further comprises at least one of a second set of two or more anterior arms extending in an anterior direction from the second body, or a second set of two or more posterior arms extending in a posterior direction from the second body. Each arm of the second set of anterior arms and each arm of the second set of posterior arms may have a physical length at least 10% of a total physical length of the second antenna portion. The antenna may also include a strap member that connects inferior edges of the first antenna portion and the second antenna portion. Furthermore, the antenna may include a first feed line and a second feed line. The first feed line extends from a superior edge of the first antenna portion. The second feed line extends from a superior edge of the second antenna portion. The first feed line and second feed line may be radiating parts of the antenna and may connect to transmitting conductors that feed the antenna. Experiments have demonstrated that antenna having this configuration may have enhanced performance, at least for on-body communication, e.g., relative to antenna styles used in previous hearing instruments, such as bowtie antennas. Arms having physical lengths 10% or greater relative to the total physical length of the antenna portions may affect the polarization of the antenna in a way that enhances propagation of a creeping wave from an ear-worn hearing instrument to a device carried in a pocket of the user's clothing and from a device carried in a pocket of the user's clothing to an ear-worn hearing instrument. For example, arms having physical lengths 10% or greater relative to the total physical length of the antenna portions may affect the polarization of the antenna so that a creeping wave produced by the antenna has a polarization normal to the user's body, which may provide the enhanced propagation.

FIG. 1 is a block diagram illustrating an example system 100 that includes hearing instruments 102A, 102B, in accordance with one or more aspects of this disclosure. This disclosure may refer to hearing instruments 102A and 102B collectively, as "hearing instruments 102." A user 104 may wear hearing instruments 102. In some instances, user 104 may wear a single hearing instrument. In other instances, the user may wear two hearing instruments, with one hearing instrument for each ear of user 104.

Hearing instruments 102 may comprise one or more of various types of devices that are configured to provide auditory stimuli to user 104 and that are designed for wear and/or implantation at, on, or near an ear of user 104. Hearing instruments 102 may be worn, at least partially, in the ear canal or concha. One or more of hearing instruments 102 may include behind the ear (BTE) components that are worn behind the ears of user 104. In some examples, hearing instruments 102 comprise devices that are at least partially implanted into or integrated with the skull of user 104. In some examples, one or more of hearing instruments 102 provide auditory stimuli to user 104 via a bone conduction pathway.

In any of the examples of this disclosure, each of hearing instruments 102 may comprise a hearing assistance device. Hearing assistance devices include devices that help a user hear sounds in the user's environment. Example types of hearing assistance devices may include hearing aid devices, Personal Sound Amplification Products (PSAPs), cochlear implant systems (which may include cochlear implant magnets, cochlear implant transducers, and cochlear implant processors), and so on. In some examples, hearing instruments 102 are over-the-counter, direct-to-consumer, or prescription devices. Furthermore, in some examples, hearing instruments 102 include devices that provide auditory stimuli to user 104 that correspond to artificial sounds or sounds that are not naturally in the environment of user 104, such as recorded music, computer-generated sounds, or other types of sounds. For instance, hearing instruments 102 may include so-called "hearables," earbuds, earphones, or other types of devices. Some types of hearing instruments provide auditory stimuli to user 104 corresponding to sounds from the environment of user 104 and also artificial sounds.

In some examples, one or more of hearing instruments 102 may be behind-the-ear (BTE) devices, which include a housing worn behind the ear contains all of the electronic components of the hearing instrument, including the receiver (i.e., the speaker). The receiver conducts sound to an earbud inside the ear via an audio tube. In some examples, one or more of hearing instruments 102 may be receiver-in-canal (RIC) hearing-assistance devices, which include a housing worn behind the ear that contains electronic components and a housing worn in the ear canal that contains the receiver.

Hearing instruments 102 may implement a variety of features that help user 104 hear better. For example, hearing instruments 102 may amplify the intensity of incoming sound, amplify the intensity of certain frequencies of the incoming sound, attenuate certain frequencies, and/or translate or compress frequencies of the incoming sound. In another example, hearing instruments 102 may implement a directional processing mode in which hearing instruments 102 selectively amplify sound originating from a particular direction (e.g., to the front of the user) while potentially fully or partially canceling sound originating from other directions. In other words, a directional processing mode may selectively attenuate off-axis unwanted sounds. The directional processing mode may help users understand conversations occurring in crowds or other noisy environments. In some examples, hearing instruments 102 may use beamforming or directional processing cues to implement or augment directional processing modes.

In some examples, hearing instruments 102 may reduce noise by canceling out or attenuating certain frequencies. Furthermore, in some examples, hearing instruments 102 may help user 104 enjoy audio media, such as music or sound components of visual media, by outputting sound based on audio data wirelessly transmitted to hearing instruments 102.

Hearing instruments 102 may be configured to communicate with each other. For instance, in any of the examples of this disclosure, hearing instruments 102 may communicate with each other using one or more wirelessly communication technologies. Example types of wireless communication technology include Near-Field Magnetic Induction (NFMI) technology, a 2.4 GHz technology, a BLUETOOTH™ technology, a WI-FI™ technology, audible sound signals, ultrasonic communication technology, infrared communication technology, an inductive communication technology, or another type of communication that does not rely on wires to transmit signals between devices. In some examples, hearing instruments 102 use a 2.4 GHz frequency band for wireless communication. In some examples of this disclosure, hearing instruments 102 may communicate with each other via non-wireless communication links (e.g., in addition to wireless communication links), such as via one or more cables, direct electrical contacts, and so on.

As shown in the example of FIG. 1, system 100 may also include a computing device 106. In other examples, system 100 does not include computing device 106. Computing device 106 may comprise one or more mobile devices, server devices, personal computer devices, handheld devices, wireless access points, smart speaker devices, smart televisions, medical alarm devices, smart key fobs, smartwatches, smartphones, motion or presence sensor devices, smart displays, screen-enhanced smart speakers, wireless routers, wireless communication hubs, prosthetic devices, mobility devices, special-purpose devices, accessory devices, and/or other types of devices. Accessory devices (not shown in FIG. 1) may include devices that are configured specifically for use with hearing instruments 102. Example types of accessory devices may include charging cases for hearing instruments 102, storage cases for hearing instruments 102, media streamer devices, phone streamer devices, external microphone devices, remote controls for hearing instruments 102, and other types of devices specifically designed for use with hearing instruments 102. One or more of hearing instruments 102 may communicate with computing device 106 using wireless or non-wireless communication links. For instance, hearing instruments 102 may communicate with computing device 106 and/or each other using any of the example types of communication technologies described elsewhere in this disclosure. For example, hearing instruments 102 may communicate with computing device 106 and/or each other using antennas conforming to the antenna designs described in this disclosure.

In the example of FIG. 1, hearing instrument 102A includes an antenna 110A and hearing instrument 102B includes an antenna 110B. This disclosure may refer to antenna 110A and antenna 110B collectively as "antennas 110." As described herein, antenna 110A includes a first antenna portion comprising a first body. The first antenna portion may further include at least one of a first set of two or more anterior arms extending in an anterior direction from the first body, or a first set of two or more posterior arms extending in a posterior direction from the first body. In other words, in some examples, the first antenna portion includes both the first set of anterior arms and the first set of posterior arms; or in some examples, the first antenna portion includes the first set of anterior arms and not the first set of posterior arms; or in some examples, the first antenna portion includes the first set of posterior arms and not the first set of anterior arms. Each arm of the first set of anterior arms and each arm of the first set of posterior arms may have a physical length at least 10% of a total physical length of the first antenna portion. Antenna 110A also includes a second antenna portion that comprises a second body. The second antenna portion includes at least one of: a second set of two or more anterior arms extending in an anterior direction from the second body, or a second set of two or more posterior arms extending in a posterior direction from the second body. In other words, in some examples, the second antenna portion includes both the second set of anterior arms and the second set of posterior arms; or in some examples, the second antenna portion includes the second set of anterior arms and not the second set of posterior arms; or in some examples, the second antenna portion includes the second set of posterior arms and not the second set of anterior arms. Each arm of the second set of anterior arms and each arm of the second set of posterior arms may have a physical length at least 10% of a total physical length of the second antenna portion. In some examples, there are the same number of arms in the first set of anterior arms and the first set of posterior arms, and there are the same number of arms in the second set of anterior arms and the second set of posterior arms. For instance, in some examples, each of the first set of anterior arms, the first set of posterior arms, the second set of anterior arms, and the second set of posterior arms may consist of three arms, two arms, four arms or another number of arms.

Antenna 110A may also include a strap member that connects inferior edges of the first antenna portion and the second antenna portion. Furthermore, antenna 110A includes a first feed line and a second feed line. The first feed line extends from a superior edge of the first antenna portion. The second feed line extends from a superior edge of the second antenna portion. Antenna 110B may have the same structure as antenna 110A. Distal ends of the arms are not connected to each other.

Figure 2:
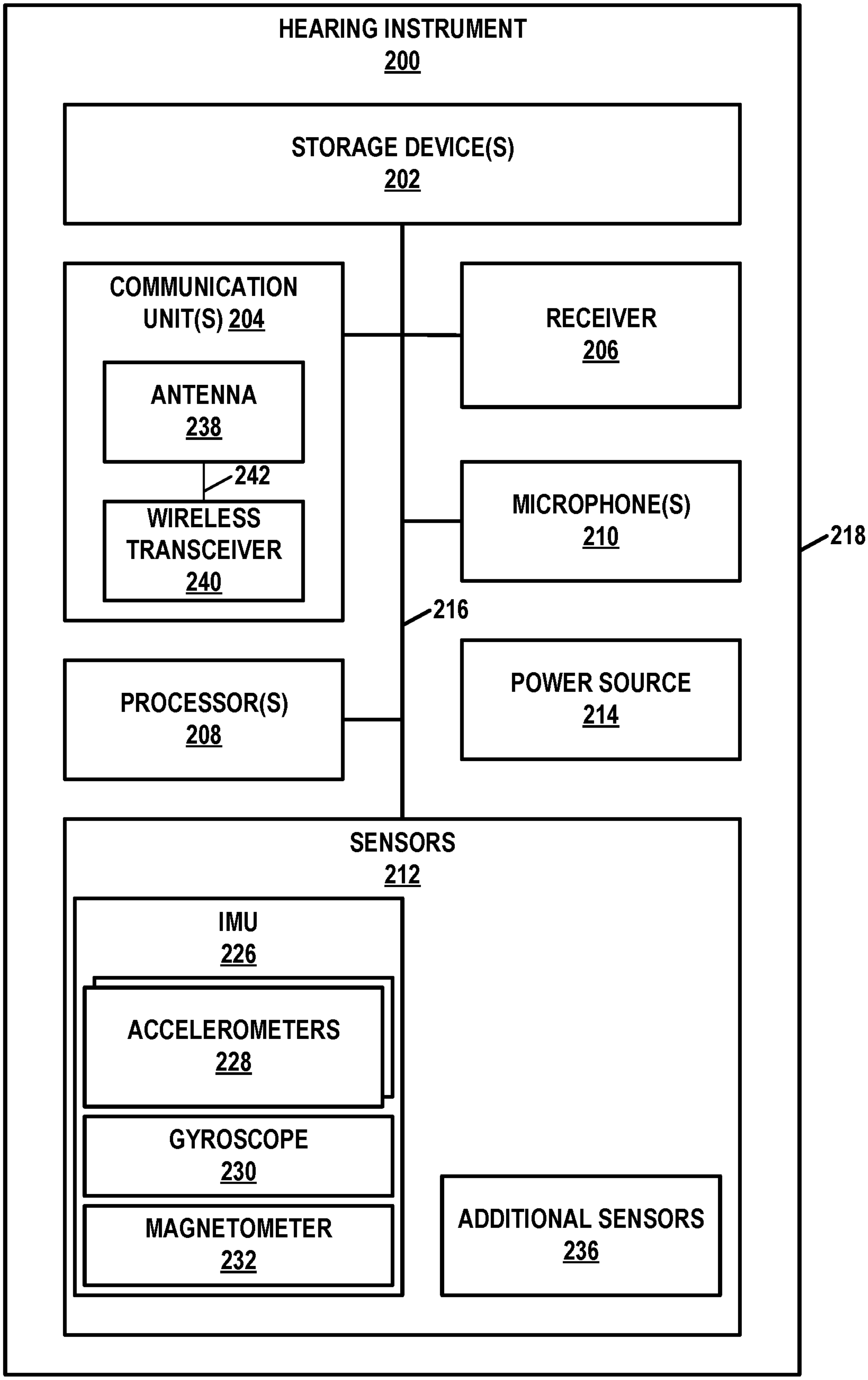
FIG. 2 is a block diagram illustrating example components of a hearing instrument, in accordance with one or more aspects of this disclosure.

FIG. 2 is a block diagram illustrating example components of hearing instrument 200, in accordance with one or more aspects of this disclosure. Hearing instrument 200 may be either one of hearing instruments 102. Each of hearing instruments 102 may include the same components as hearing instrument 200.

In the example of FIG. 2, hearing instrument 200 comprises one or more storage devices 202, one or more communication unit(s) 204, a receiver 206, one or more processor(s) 208, one or more microphone(s) 210, a set of sensors 212, a power source 214, and one or more communication channels 216. Communication channels 216 provide communication between storage devices 202, communication unit(s) 204, receiver 206, processor(s) 208, a microphone(s) 210, and sensors 212. Storage devices 202, communication units 204, receiver 206, processors 208, microphones 210, and sensors 212 may draw electrical power from power source 214. In the example of FIG. 2, each of storage devices 202, communication units 204, receiver 206, processors 208, microphones 210, and sensors 212, power source 214, and communication channels 216 may be contained within a single housing 218.

Furthermore, in the example of FIG. 2, sensors 212 include an inertial measurement unit (IMU) 226 that is configured to generate data regarding the motion of hearing instrument 200. IMU 226 may include a set of sensors. For instance, in the example of FIG. 2, IMU 226 includes one or more of accelerometers 228, a gyroscope 230, a magnetometer 232, combinations thereof, and/or other sensors for determining the motion of hearing instrument 200. Furthermore, in the example of FIG. 2, hearing instrument 200 may include one or more additional sensors 236. Additional sensors 236 may include a photoplethysmography (PPG) sensor, blood oximetry sensors, blood pressure sensors, electrocardiograph (EKG) sensors, body temperature sensors, electroencephalography (EEG) sensors, environmental temperature sensors, environmental pressure sensors, environmental humidity sensors, skin galvanic response sensors, and/or other types of sensors. In other examples, hearing instrument 200 and sensors 212 may include more, fewer, or different components.

Storage devices 202 may store data. Storage devices 202 may comprise volatile memory and may therefore not retain stored contents if powered off. Examples of volatile memories may include random access memories (RAM), dynamic random access memories (DRAM), static random access memories (SRAM), and other forms of volatile memories known in the art. Storage devices 202 may further be configured for long-term storage of information as non-volatile memory space and retain information after power on/off cycles. Examples of non-volatile memory configurations may include magnetic hard discs, optical discs, floppy discs, flash memories, or forms of electrically programmable memories (EPROM) or electrically erasable and programmable (EEPROM) memories.

Communication unit(s) 204 may enable hearing instrument 200 to send data to and receive data from one or more other devices, such as another hearing instrument, an accessory device, a mobile device, or another type of device. Communication unit(s) 204 may enable hearing instrument 200 to communicate using wireless or non-wireless communication technologies. For instance, communication unit(s) 204 enable hearing instrument 200 to communicate using one or more of various types of wireless technology, such as a BLUETOOTH™ technology, 3G, 4G, 4G LTE, 5G, ZigBee, WI-FI™, Near-Field Magnetic Induction (NFMI), ultrasonic communication, infrared (IR) communication, or another wireless communication technology. In some examples, communication unit(s) 204 may enable hearing instrument 200 to communicate using a cable-based technology, such as a Universal Serial Bus (USB) technology.

As shown in the example of FIG. 2, one or more of communication units 204 include an antenna 238 and a wireless transceiver 240. Antenna 238 may correspond to antenna 110A or 110B in FIG. 1. Wireless transceiver 240 may comprise circuitry configured to generate modulated electrical signals sent to antenna 238 and/or to process electrical signals received from antenna 238. Transmission conductors 242 may connect wireless transceiver 240 to antenna 238. Transmission conductors 242 may include a pair of conductors.

Antenna 238 may be implemented in accordance with any of the example antenna designs described in this disclosure. For instance, antenna 238 may include a first antenna portion comprising a first body. The first antenna portion further includes at least one of: a first set of two or more anterior arms extending in an anterior direction from the first body, or a first set of two or more posterior arms extending in a posterior direction from the first body. Antenna 238 may also include a second antenna portion comprising a second body. The second antenna portion further comprises at least one of: a second set of two or more anterior arms extending in an anterior direction from the second body, or a second set of two or more posterior arms extending in a posterior direction from the second body. Additionally, antenna 238 may include a strap member that connects inferior edges of the first antenna portion and the second antenna portion. Antenna 238 may also include a first feed line extending from a superior edge of the first antenna portion and a second feed line extending from a superior edge of the second antenna portion. The first and second feed lines may connect antenna 238 to wireless transceiver 240. Various components of hearing instrument 200 may be positioned between the first antenna portion and the second antenna portion, such as storage devices 202, wireless transceiver 240, processors 208, microphones 210, sensors 212, and power source 214. The first and second antenna portions may be adjacent to opposite interior surfaces of housing 218. Thus, the first antenna portion may proximate a medial side of the hearing instrument and the second antenna portion may be proximate a lateral side of the hearing instrument.

Receiver 206 comprises one or more speakers for generating audible sound. Microphones 210 detects incoming sound and generates one or more electrical signals (e.g., an analog or digital electrical signal) representing the incoming sound.

Processors 208 may be processing circuits configured to perform various activities. For example, processor(s) 208 may process the signal generated by microphones 210 to enhance, amplify, or cancel-out particular channels within the incoming sound. Processors 208 may then cause receiver 206 to generate sound based on the processed signal. In some examples, processors 208 include one or more digital signal processors (DSPs). In some examples, processors 208 may cause communication units 204 to transmit one or more of various types of data. For example, processors 208 may cause communication units 204 to transmit data to computing device 106. In some examples, processors 208 may cause communication units 204 to transmit data to another hearing instrument. Furthermore, communication units 204 may receive audio data from computing device 106 and processors 208 may cause receiver 206 to output sound based on the audio data.

Figure 3:
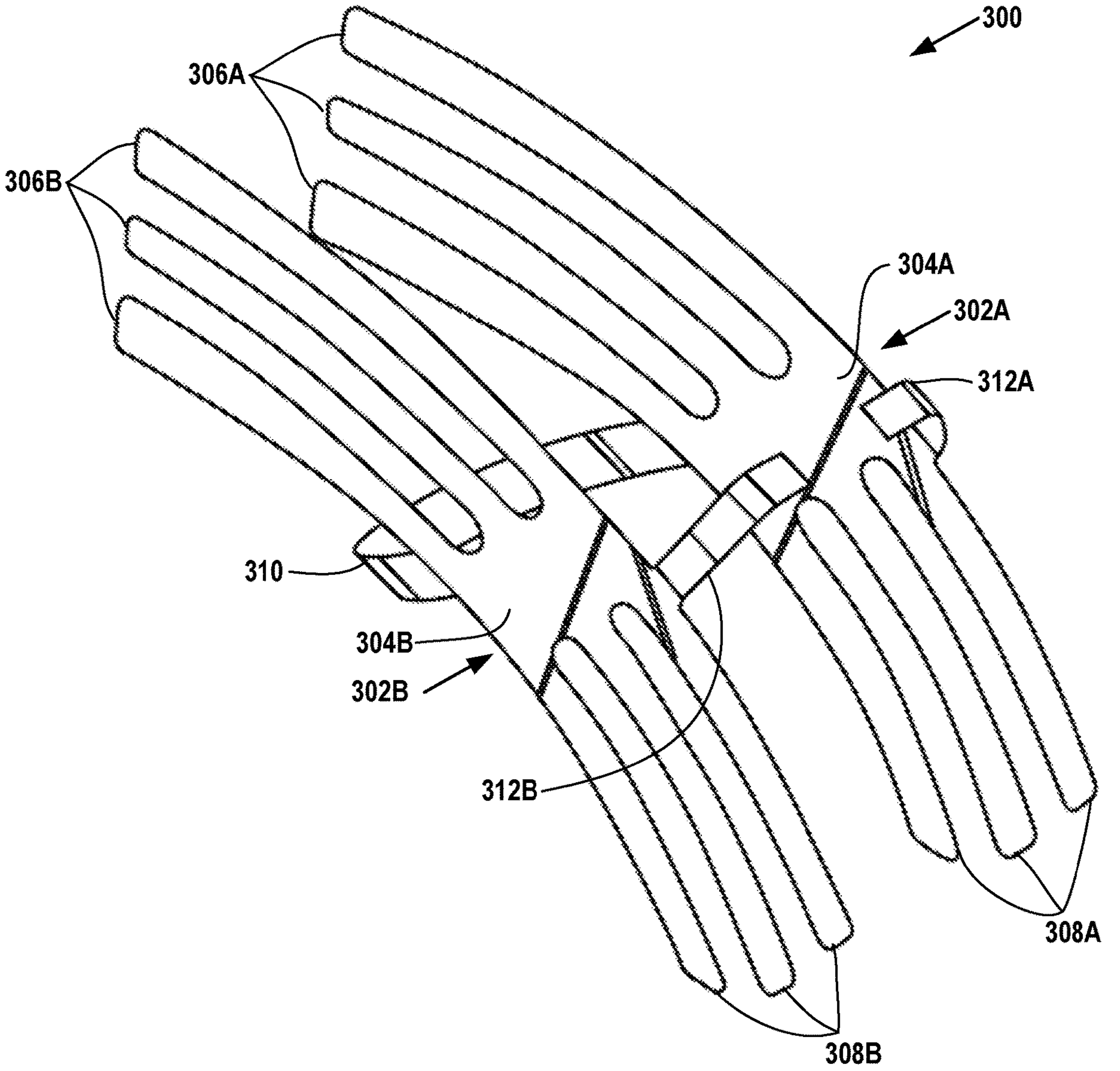
FIG. 3 is a conceptual diagram illustrating example components of an antenna, in accordance with one or more aspects of this disclosure.

FIG. 3 is a conceptual diagram illustrating an example antenna 300, in accordance with one or more aspects of this disclosure. Antenna 300 may correspond to either of antennas 110 (FIG. 1) or antenna 238 (FIG. 2). In the example of FIG. 3, antenna 300 includes a first antenna portion 302A and a second antenna portion 302B (collectively, "antenna portions 302"). Antenna portion 302A may be proximate a medial side of a hearing instrument (e.g., hearing instrument 102A, 102B). The medial side of the hearing instrument is a side of the hearing instrument closer to the midline of the user. Antenna portion 302B may be proximate a lateral side of the hearing instrument. The lateral side of the hearing instrument is a side of the hearing instrument further from the midline of the user.

Antenna portion 302A comprises a first body 304A, a first set of two or more anterior arms 306A extending in an anterior direction from the first body 304A, and a first set of two or more posterior arms 308A extending in a posterior direction from the first body 304A. Each arm of the first set of anterior arms 306A and each arm of the first set of posterior arms 308A may have a physical length at least 10% of a total physical length of first antenna portion 302A. Antenna portion 302B comprises a second body 304B, a second set of two or more anterior arms 306B extending in an anterior direction from the second body, and a second set of two or more posterior arms 308B extending in a posterior direction from second body 304B. Each arm of the second set of anterior arms 306B and each arm of the second set of posterior arms 308B may have a physical length at least 10% of a total physical length of second antenna portion 302B. In the example of FIG. 3, each of the first set of anterior arms 306A, the first set of posterior arms 308A, the second set of anterior arms 306B, and the second set of posterior arms 308B is arc shaped. In other examples, one or more of the first set of anterior arms 306A, the first set of posterior arms 308A, the second set of anterior arms 306B, and the second set of posterior arms 308B may be straight or may have another shape. In some examples, superior edges of anterior arms 306A, anterior arms 306B, posterior arms 308A and/or posterior arms 308B, are parallel. In some examples, inferior edges of anterior arms 306A, anterior arms 306B, posterior arms 308A and/or posterior arms 308B, are parallel.

In some examples, one or more holes are defined in body 304A and 304B (collectively, "bodies 304"). In other examples, such as the example of FIG. 3, no holes are defined in bodies 304.

Antenna 300 also includes a strap member 310 that connects inferior edges of first antenna portion 302A and second antenna portion 302B. Strap member 310 conducts electrical current between antenna portion 302A and antenna portion 302B. In the example of FIG. 3, strap member 310 connect to antenna portions 302 at the proximal ends of inferior anterior arms of antenna portions 302. In other examples, strap member 310 may connect antenna portions 302 at other locations on the inferior edges of antenna portions 302.

Furthermore, antenna 300 includes a first feed line 312A and a second feed line 312B (collectively, "feed lines 312"). Feed line 312A extends from a superior edge of antenna portion 302A. Feed line 312B extends from a superior edge of antenna portion 302B. Feed lines 312 may be radiating portions of antenna 300. Feed lines 312 conduct electrical current to antenna portions 302 and a wireless transceiver (e.g., wireless transceiver 240). More specifically, feed lines 312 may conduct electrical current to/from transmission conductors (e.g., transmission conductors 242) connected to the wireless transceiver. The transmission conductors may be a pair of conductors (e.g., wires, traces, etc.) extending from the wireless transceiver to feed lines 312. Thus, in some examples, the pair of transmission conductors may be considered a line that feeds an antenna that includes "feed lines 312." The transmission conductors themselves may or may not radiate. In the example of FIG. 3, feed lines 312 connect to antenna portions 302 at the proximal ends of superior posterior arms of antenna portions 302. In other examples, feed lines 312 may connect to antenna portions 302 at other locations on the superior edges of antenna portions 302.

Although not shown in the example of FIG. 3, in some examples, for at least one arm of anterior arms 306A, posterior arms 308A, anterior arms 306B, and the second set of posterior arms, a distal end of the arm is subdivided into a plurality of sub-arms. In some examples, each of anterior arms 306A, posterior arms 308A, anterior arms 306B, and the second set of posterior arms, a distal end of the arm is subdivided into a plurality of sub-arms. Each sub-arm of an arm may extend in the same direction as the arm. In some examples, the subdivision of arms into sub-arms does not reduce the space between arms. An example of an arm sub-divided into sub-arms is described with respect to FIG. 8, below.

Antenna 300 may be formed from one or more of a variety of electrically conductive materials, such as copper.

Figure 4:
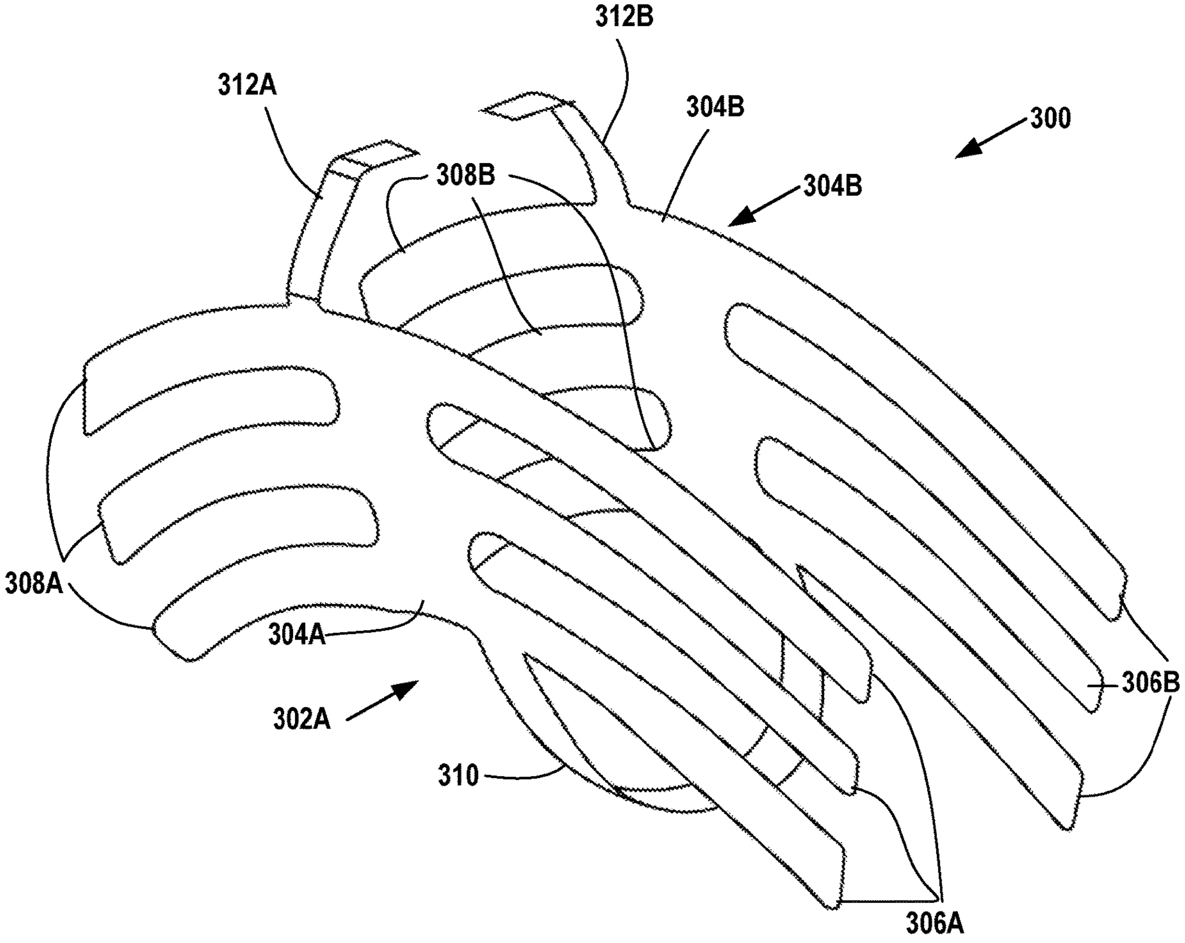
FIG. 4 is a conceptual diagram illustrating an isometric view of the example antenna, in accordance with one or more aspects of this disclosure.
Figure 5:
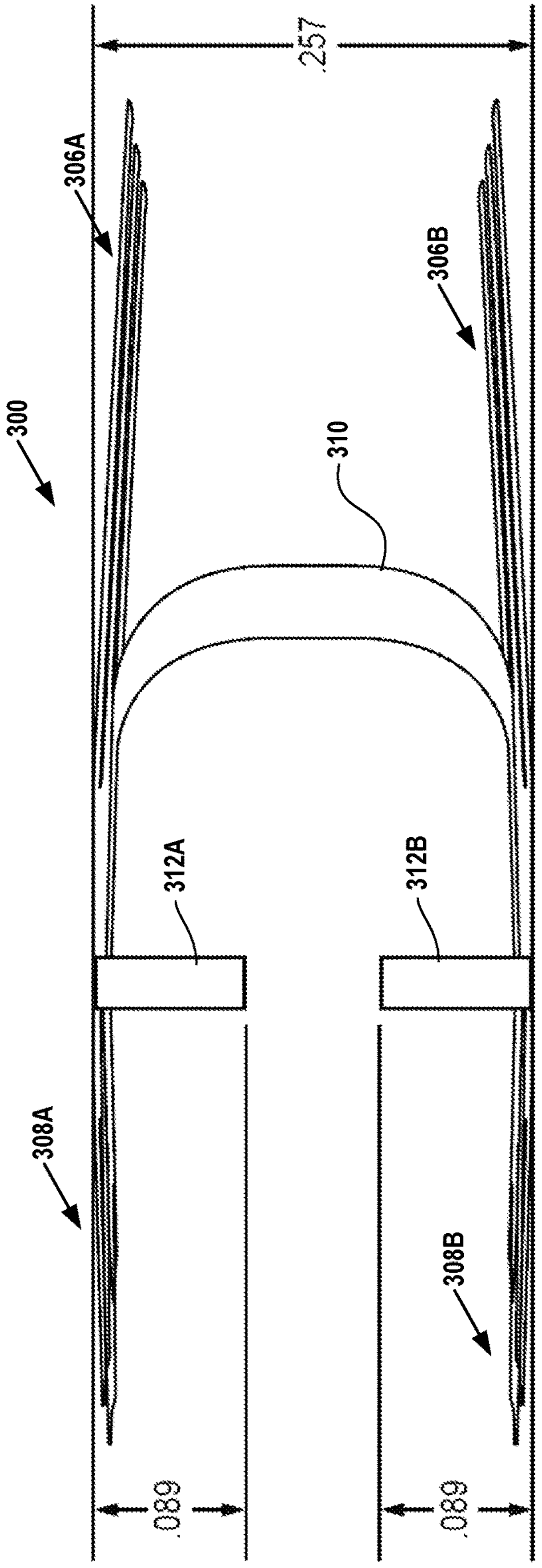
FIG. 5 is a conceptual diagram illustrating a top view of the example antenna, in accordance with one or more aspects of this disclosure.

FIG. 4 is a conceptual diagram illustrating an isometric view of antenna 300, in accordance with one or more aspects of this disclosure. The view of antenna 300 shown in FIG. 4 may be the reverse of the view of antenna 300 shown in FIG. 3. FIG. 5 is a conceptual diagram illustrating a top view of antenna 300, in accordance with one or more aspects of this disclosure. As shown in the example of FIG. 4, feed lines 312 may each extend toward a midline of antenna 300 by a distance of 0.089 inches (2.2606 millimeters (mm)). In other examples, feed lines 312 may extend toward a midline of antenna 300 by different distances. Furthermore, in the example of FIG. 5, the maximum total width of antenna 500 is 0.257 inches (6.5278 mm). In other examples, antenna 300 may have other widths. Furthermore, as shown in the example of FIG. 4, the distal ends of the anterior arms 306A deflect toward the distal ends of anterior arms 306B, and the distal ends of posterior arms 308A deflect toward the distal ends of posterior arms 308B. In other examples, the distal ends of the anterior arms 306A do not deflect toward the distal ends of anterior arms 306B and/or the distal ends of posterior arms 308A do not deflect toward the distal ends of posterior arms 308B.

Figure 6:
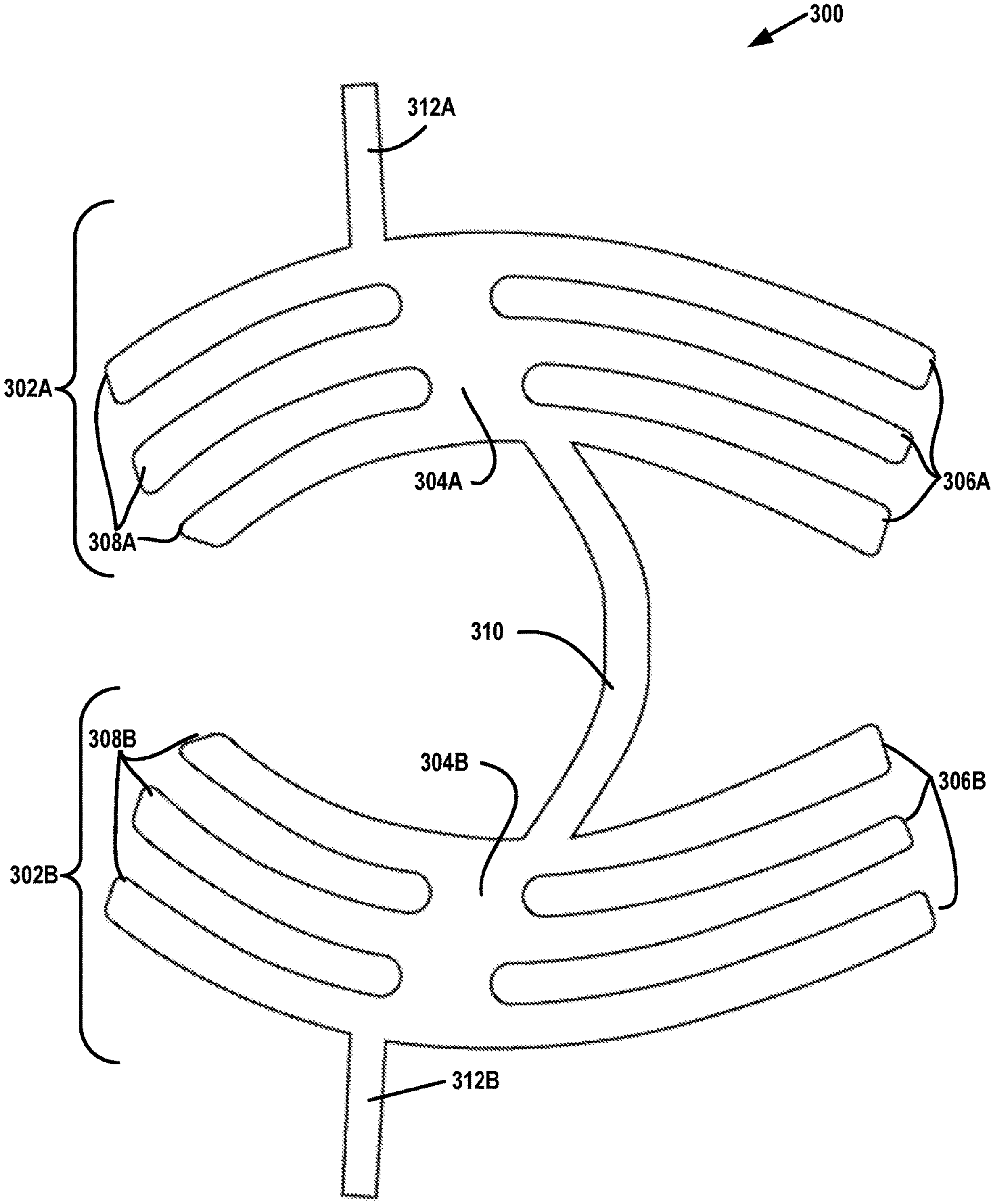
FIG. 6 is a conceptual diagram illustrating a view of the example antenna in flattened form, in accordance with one or more aspects of this disclosure.

FIG. 6 is a conceptual diagram illustrating a view of antenna 300 in flattened form, in accordance with one or more aspects of this disclosure. In some examples, antenna 300 may be manufactured by cutting antenna 300 from a flat piece of metal. Antenna 300 may then be bent to the shape shown in FIG. 4 and FIG. 5. In other examples, antenna 300 may be manufactured as a single or multi-layer flex circuit. In some examples, antenna 300 may be manufactured by other methods including but not limited to: laser direct structuring, laser etching, conductive inkjet printing, 3D printing, or screen printing.

Figure 7:
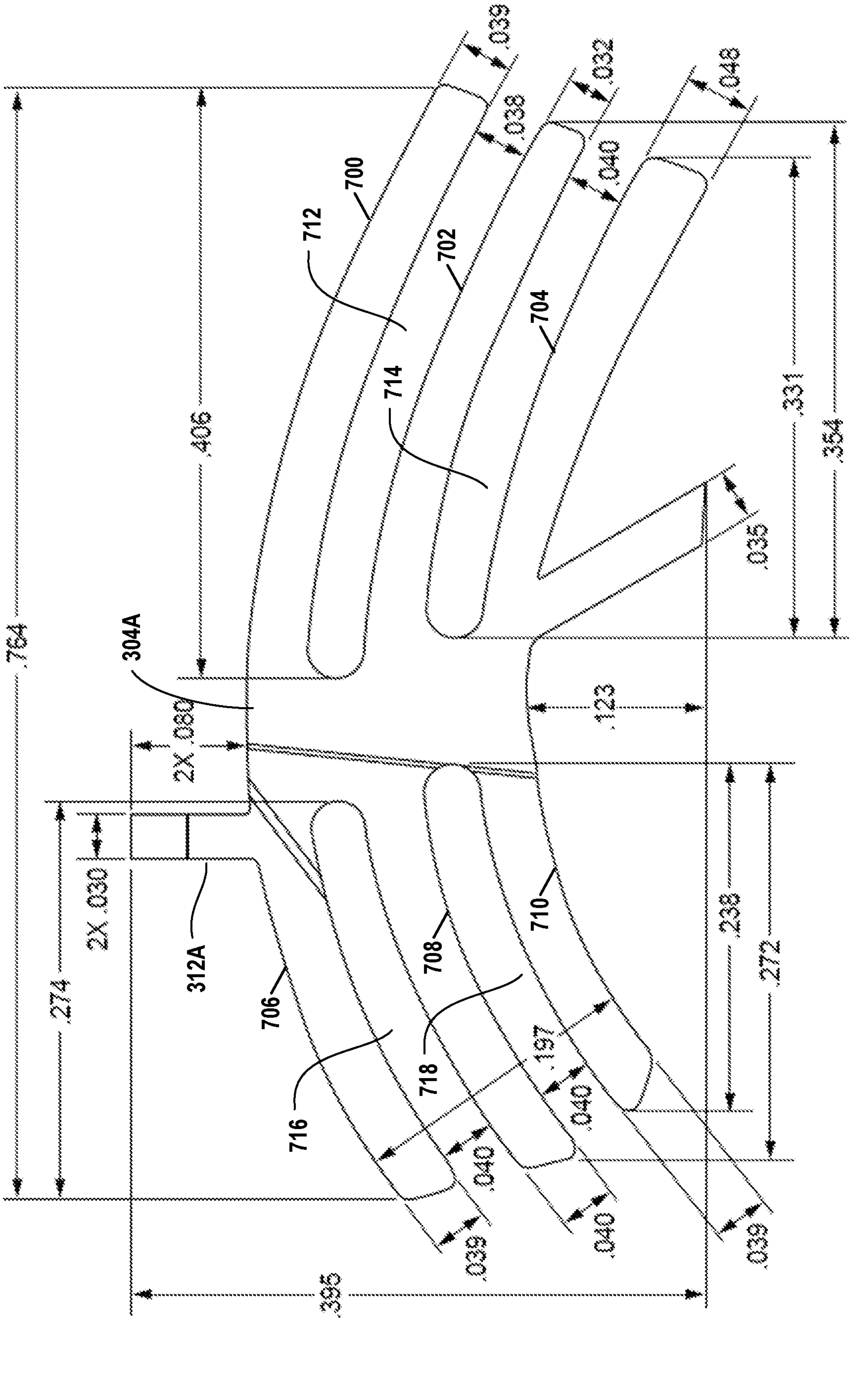
FIG. 7 is a conceptual diagram illustrating a side view of the example antenna, in accordance with one or more aspects of this disclosure.

FIG. 7 is a conceptual diagram illustrating a side view of antenna 300, in accordance with one or more aspects of this disclosure. Antenna portions 302 are symmetrical. Accordingly, in the example of FIG. 7, only one of antenna portions 302 is visible. This disclosure discusses FIG. 7 with reference to antenna portion 302A and subdivisions thereof, but the same discussion may apply with respect to antenna portion 302B and subdivisions thereof.

Anterior arms 306A include a superior-anterior arm 700, a middle-anterior arm 702, and an inferior-anterior arm 704. Posterior arms 308A include a superior-posterior arm 706, a middle-posterior arm 708, and an inferior-posterior arm 710. In the example of FIG. 7, superior-anterior arm 700 has a width of 0.039 inches (0.9906 mm), middle-anterior arm 702 has a width of 0.032 inches (0.8128 mm), inferior-anterior arm 704 has a width of 0.048 inches (1.2192 mm), superior-posterior arm 706 has a width of 0.039 inches (0.9906 mm), middle-posterior arm 708 has a width of 0.040 inches (1.016 mm), and inferior-posterior arm 710 has a width of 0.039 inches (0.9906 mm). In other examples, superior-anterior arm 700, middle-anterior arm 702, inferior-anterior arm 704, superior-posterior arm 706, middle-posterior arm 708, and inferior-posterior arm 710 may have different widths. For instance, in some examples, the widths may be approximately those indicated above (e.g., +/−0.01 inches) or have other widths.

In some examples, each arm of the first set of anterior arms 306A, the first set of posterior arms 308A, the second set of anterior arms 306B, and the second set of posterior arms 308B has the same width through their entire physical lengths, with the possible exception of proximal and distal ends of the arm. For instance, in the example of FIG. 7, superior-anterior arm 700, middle-anterior arm 702, inferior-anterior arm 704, superior-posterior arm 706, middle-posterior arm 708, and inferior-posterior arm 710 each have the same widths through their entire physical lengths excepting their proximal and distal ends. In other words, the superior and inferior edges of the arms may be parallel. In other examples, one or more of superior-anterior arm 700, middle-anterior arm 702, inferior-anterior arm 704, superior-posterior arm 706, middle-posterior arm 708, and inferior-posterior arm 710 has another shape. For instance, one or more of superior-anterior arm 700, middle-anterior arm 702, inferior-anterior arm 704, superior-posterior arm 706, middle-posterior arm 708, and inferior-posterior arm 710 may have a tapered shape that is wider at the distal or proximal end.

In some examples, spaces between the first set of anterior arms 306A, spaces between the first set of posterior arms 308A, spaces between the second set of anterior arms 306B, and spaces between the second set of posterior arms 308B each have physical lengths at least 10% of the total physical lengths of the first and second antenna portions. For instance, in the example of FIG. 7, a superior-anterior space 712 is defined between superior-anterior arm 700 and middle-anterior arm 702. An inferior-anterior space 714 is defined between middle-anterior arm 702 and inferior-anterior arm 704. A superior-posterior space 716 is defined between superior-posterior arm 706 and middle-posterior arm 708. An inferior-posterior space 718 is defined between middle-posterior arm 708 and inferior-posterior arm 710. In the example of FIG. 7, superior-anterior space 712 has a width of 0.038 inches (0.9652 mm), inferior-anterior space 714 has a width of 0.040 inches (1.016 mm), superior-posterior space 716 has a width of 0.040 inches (1.016 mm), and inferior-posterior space 718 has a width of 0.040 inches (1.016 mm). In other examples, one or more of superior-anterior space 712, inferior-anterior space 714, superior-posterior space 716, and inferior-posterior space 718 have different widths than shown in the example of FIG. 7. A physical length of superior-anterior space 712 is 0.406 inches (10.3124 mm). A physical length of inferior-anterior space 714 is 0.354 inches (8.9916 mm) as measured from a most-distal point on middle-anterior arm 702 and 0.331 inches (8.4074 mm) as measured from a most-distal point on inferior-anterior arm 704. A physical length of superior-posterior space 716 is 0.274 inches (6.9596 mm). A physical length of inferior-posterior space 718 is 0.272 inches (6.9088 mm) as measured from the most-distal point on middle-posterior arm 708 and 0.238 inches (6.0452 mm) as measured from the most-distal point on inferior-posterior arm 710. In other examples, superior-anterior space 712, inferior-anterior space 714, superior-posterior space 716, and inferior-posterior space 718 may have different widths or physical lengths. For instance, the widths or physical lengths may be approximately those indicated above (e.g., +/−0.01 inches) or have other widths or physical lengths.

In the example of FIG. 7, each of superior-anterior arm 700, middle-anterior arm 702, inferior-anterior arm 704, superior-posterior arm 706, middle-posterior arm 708, and inferior-posterior arm 710 is arc shaped. Moreover, in some examples, edges of corresponding arms may form continuous (e.g., without slope discontinuities) lines with each other. Thus, in the example of FIG. 7, a curved line defined by a superior edge of superior-anterior arm 700 is continuous with a curved line defined by a superior edge of superior-posterior arm 706, a curved line defined by an inferior edge of superior-anterior arm 700 is continuous with a curved line defined by an inferior edge of superior-posterior arm 706, a curved line defined by a superior edge of middle-anterior arm 702 is continuous with a curved line defined by a superior edge of the middle-posterior arm 708, and a curved line defined by an inferior edge of the inferior-anterior arm 704 is continuous with a curved line defined by an inferior edge of inferior-posterior arm 710.

In some examples, each pair of corresponding arms in the anterior arms 306 and posterior arms 308 may have radiation properties similar to a dipole antenna. For instance, superior-anterior arm 700 and superior-posterior arm 706 may have radiation properties similar to a first dipole antenna, middle-anterior arm 702 and middle-posterior arm 708 may have radiation properties similar to a second dipole antenna, and inferior-anterior arm 704 and inferior-posterior arm 710 may have radiation properties similar to a third dipole antenna.

In the example of FIG. 7, a width of strap member 310 is 0.035 inches (0.889 mm). A total height of strap member 310 (i.e., a distance from a superior-most point on the inferior edge of body 304A to an inferior-most point on strap member 310) is 0.123 inches (3.1242 mm). A total physical length of antenna 300, as measured from a distal-most point on anterior arms 306A to a distal-most point on posterior arms 308) is 0.764 inches (19.4056 mm). A total height of antenna 300, as measured from a superior-most point on feed line 312A to an inferior-most point on strap member 310, is 0.395 inches (10.033 mm). A width of feed line 312A is 0.030 inches (0.762 mm). A height of feed line 312A (i.e., a distance from a superior-most point on feed line 312A to a superior-most point on body 304A) is 0.080 inches (2.032 mm). In other examples, strap member 310, antenna 300, and feed line 312A may have different dimensions.

In some examples, the width of strap member 310 may change along its course (e.g., a middle of strap member 310 may be wider or narrower than one or more ends of strap member 310, one end of strap member 310 may be wider than another end of strap member 310, or different ends or portions of strap member 310 may vary in some other way. In some examples, the height of strap member 310 is symmetrical along its length. In other examples, the height of strap member 310 is asymmetrical along its length. Similarly, widths of feed lines 312 may change along their courses (e.g., the widths of feed lines 312 may increase as they approach bodies 304).

In some examples, a combined width of the first set of anterior arms 306A and the spaces between the first set of anterior arms 306A is equal to a combined width of the first set of posterior arms 308A and the spaces between the first set of posterior arms 308A. For instance, in the example of FIG. 7, a combined width of superior-anterior arm 700, space 712, middle-anterior arm 702, space 714, and inferior-anterior arm 704 is equal to 0.197 inches (5.0038 mm) and a combined width of superior-posterior arm 706, space 716, middle-posterior arm 708, space 718, and inferior-posterior arm 710 is equal to 0.197 inches (5.0038 mm). The same may apply with respect to antenna portion 302B. In other examples, the combined width of the first set of anterior arms 306A and the spaces between the first set of anterior arms 306A is not equal to the combined width of the first set of posterior arms 308A and the spaces between the first set of posterior arms 308A.

Figure 8:
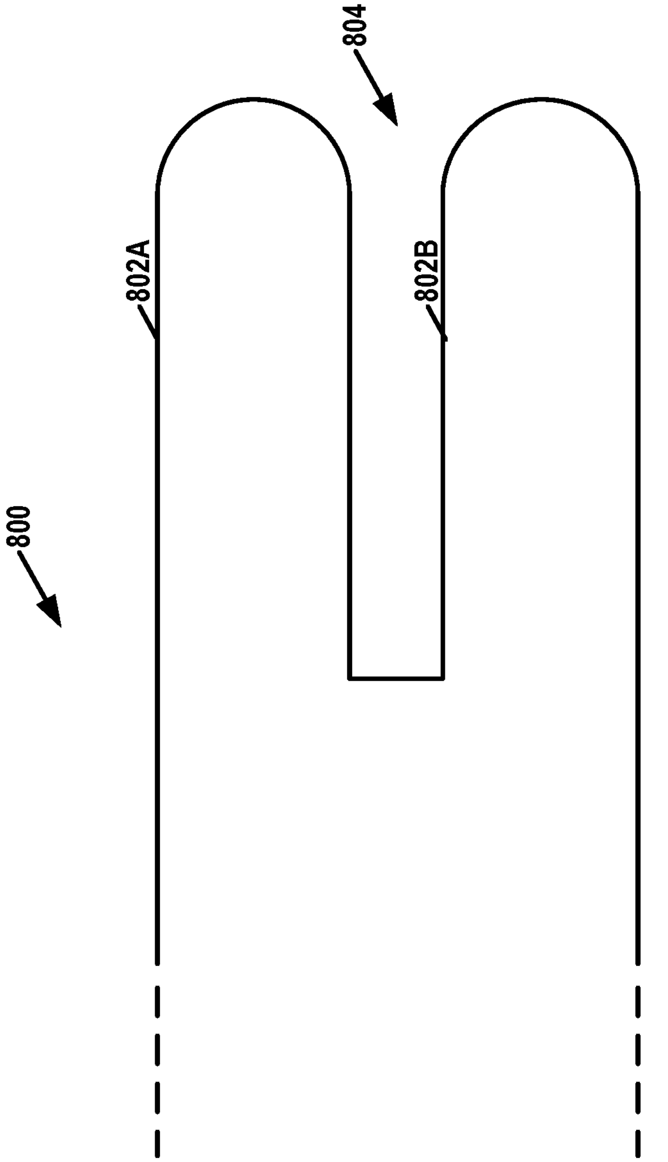
FIG. 8 is a conceptual diagram illustrating an example distal end of an arm subdivided into sub-arms, in accordance with one or more aspects of this disclosure.

FIG. 8 is a conceptual diagram illustrating an example distal end of an arm 800 subdivided into sub-arms 802A, 802B, in accordance with one or more aspects of this disclosure. This disclosure may refer to sub-arms 802A, 802B collectively, as "sub-arms 802." In other examples, arm 800 may include more than two sub-arms.

Arm 800 may be any of anterior arms 306 or posterior arms 308. In the context of an arm of an antenna of this disclosure, the term distal may refer to a direction away from a body to which the arm is connected. The dashed lines in FIG. 8 represent that there may be a proximal portion of arm 800 not shown in FIG. 8. In the example of FIG. 8, sub-arms 802 have rounded ends. In other examples, the ends of sub-arms 802 may have different shapes, such as squared-off ends or pointed ends. Similarly, in the example of FIG. 8, the proximal end of a space 804 between sub-arms 802 has a squared-off shape. In other examples, the proximal end of space 804 may have other shapes, such as a pointed shape, a rounded shape, or another type of shape. In the example of FIG. 8, sub-arms 802 are substantially parallel. In other examples, sub-arms 802 may diverge from each other in non-parallel directions.

With reference to antenna 300 and other antennas described in this disclosure, "superior" and "inferior" correspond to opposite directions on an axis. The superior direction of the axis is generally upward when a hearing instrument that includes antenna 300 is worn and the inferior direction of the axis is generally downward when the hearing instrument is worn. However, the axis is not necessarily straight up or down relative to the transverse axis of the user's body.

Figure 9:
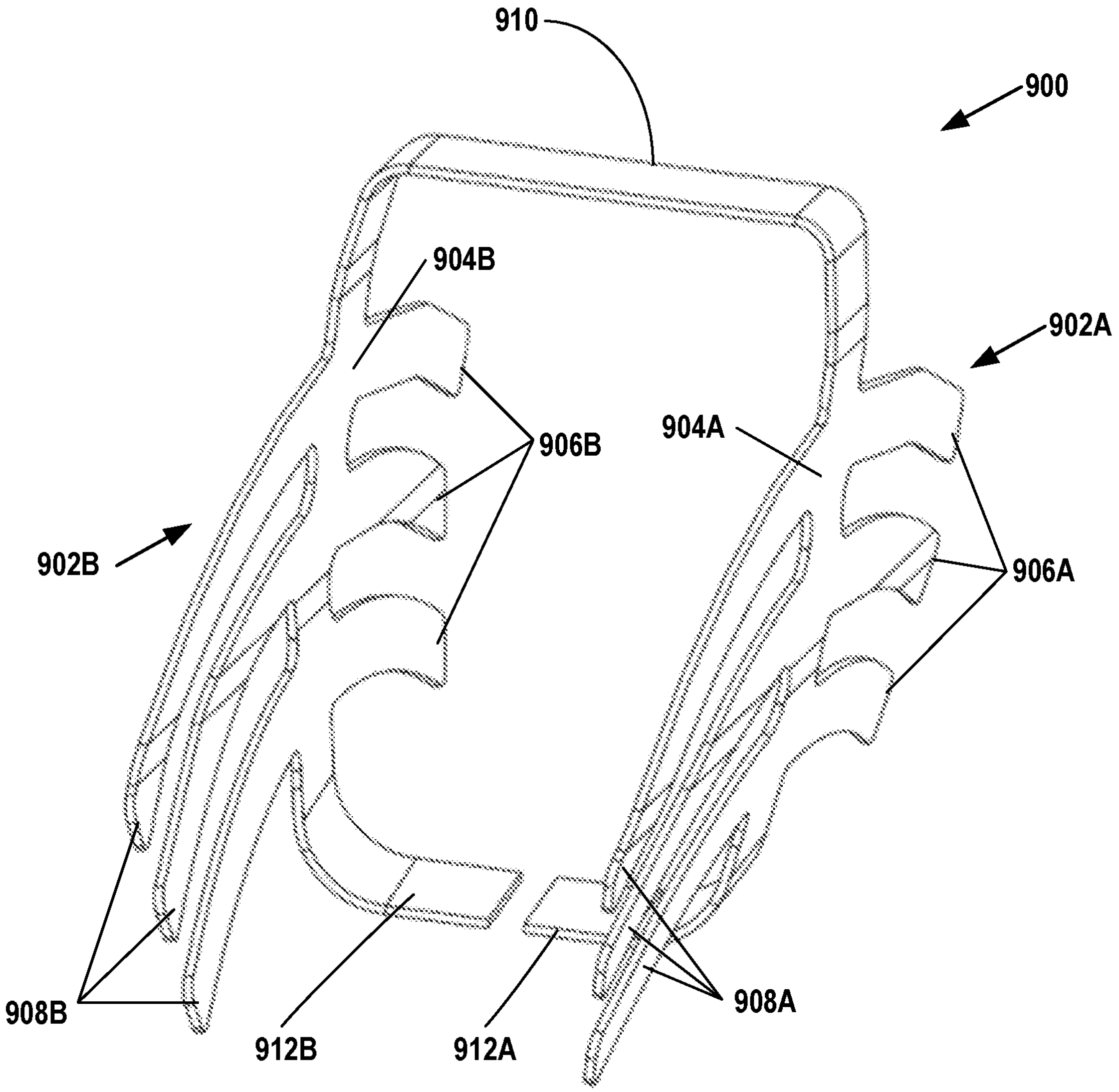
FIG. 9 is a conceptual diagram illustrating an example antenna in accordance with one or more aspects of this disclosure.

FIG. 9 is a conceptual diagram illustrating an example antenna 900 in accordance with one or more aspects of this disclosure. Antenna 900 is similar to antenna 300. For instance, antenna 900 includes a first antenna portion 902A and a second antenna portion 902B (collectively, "antenna portions 902"). Antenna portion 902A may be positioned proximate a medial side of a hearing instrument (e.g., hearing instrument 102A, 102B). The medial side of the hearing instrument is a side of the hearing instrument closer to the midline of the user. Antenna portion 902B may be positioned proximate a lateral side of the hearing instrument. The lateral side of the hearing instrument is a side of the hearing instrument further from the midline of the user.

Antenna portion 902A comprises a first body 904A, a first set of two or more anterior arms 906A extending in an anterior direction from the first body 904A, and a first set of two or more posterior arms 908A extending in a posterior direction from the first body 904A. Each arm of the first set of anterior arms 906A and each arm of the first set of posterior arms 908A may have a physical length at least 10% of a total physical length of first antenna portion 902A.

Antenna portion 902B comprises a second body 904B, a second set of two or more anterior arms 906B extending in an anterior direction from the second body, and a second set of two or more posterior arms 908B extending in a posterior direction from second body 904B. Each arm of the second set of anterior arms 906B and each arm of the second set of posterior arms 908B may have a physical length at least 10% of a total physical length of second antenna portion 902B. In the example of FIG. 9, each of the first set of anterior arms 906A, the first set of posterior arms 908A, the second set of anterior arms 906B, and the second set of posterior arms 908B is arc shaped. In other examples, one or more of the first set of anterior arms 906A, the first set of posterior arms 908A, the second set of anterior arms 906B, and the second set of posterior arms 908B may be straight or may have another shape. In some examples, superior edges of anterior arms 906A, anterior arms 906B, posterior arms 908A and/or posterior arms 908B, are parallel. In some examples, inferior edges of anterior arms 906A, anterior arms 906B, posterior arms 908A and/or posterior arms 908B, are parallel.

In some examples, one or more holes are defined in body 904A and 904B (collectively, "bodies 904"). In other examples, such as the example of FIG. 9, no holes are defined in bodies 904.

Antenna 900 also includes a strap member 910 that connects superior edges of first antenna portion 902A and second antenna portion 902B. Strap member 910 conducts electrical current between antenna portion 902A and antenna portion 902B. In the example of FIG. 9, strap member 910 connect to antenna portions 902 at bodies 904. In other examples, strap member 910 may connect antenna portions 902 at other locations on the superior edges of antenna portions 902.

Furthermore, antenna 900 includes a first feed line 912A and a second feed line 912B (collectively, "feed lines 912"). Feed line 912A extends from an inferior edge of antenna portion 902A. Feed line 912B extends from an inferior edge of antenna portion 902B. Feed lines 912 may be radiating parts of antenna 900. In other examples, feed lines 912 are not radiating parts of antenna 900. Feed lines 912 conduct electrical current to antenna portions 902 and a wireless transceiver (e.g., wireless transceiver 240). More specifically, feed lines 912 may conduct electrical current to/from transmission conductors (e.g., transmission conductors 242) connected to the wireless transceiver. The transmission conductors may be a pair of wires extending from the wireless transceiver to feed lines 912. Thus, the transmission conductors may be considered a line that feeds an antenna that includes "feed lines 912." The transmission conductors themselves may or may not radiate. In the example of FIG. 9, feed lines 912 connect to antenna portions 902 at the proximal ends of superior posterior arms of antenna portions 902. In other examples, feed lines 912 may connect to antenna portions 902 at other locations on the inferior edges of antenna portions 902. In some examples, having strap member 910 located at the superior edges of antenna portions 902 and having feed lines 912 connect to antenna portions 902 at the inferior edges of antenna portions 902 may allow antenna 900 to be used hearing instruments having different form factors than hearing instruments in which antenna 300 may be used. For instance, the having strap member 910 located at the superior edges of antenna portions 902 and having feed lines 912 connect to antenna portions 902 at the inferior edges of antenna portions 902 may allow designers of certain hearing instruments to take better manage the space within the housings of the hearing instruments.

Although not shown in the example of FIG. 9, in some examples, for at least one arm of anterior arms 906A, posterior arms 908A, anterior arms 906B, and the second set of posterior arms, a distal end of the arm may be subdivided into a plurality of sub-arms. In some examples, each of anterior arms 906A, posterior arms 908A, anterior arms 906B, and the second set of posterior arms, a distal end of the arm may be subdivided into a plurality of sub-arms. Each sub-arm of an arm may extend in the same direction as the arm. In some examples, the subdivision of arms into sub-arms does not reduce the space between arms. An example of an arm sub-divided into sub-arms is described with respect to FIG. 8.

Figure 10:
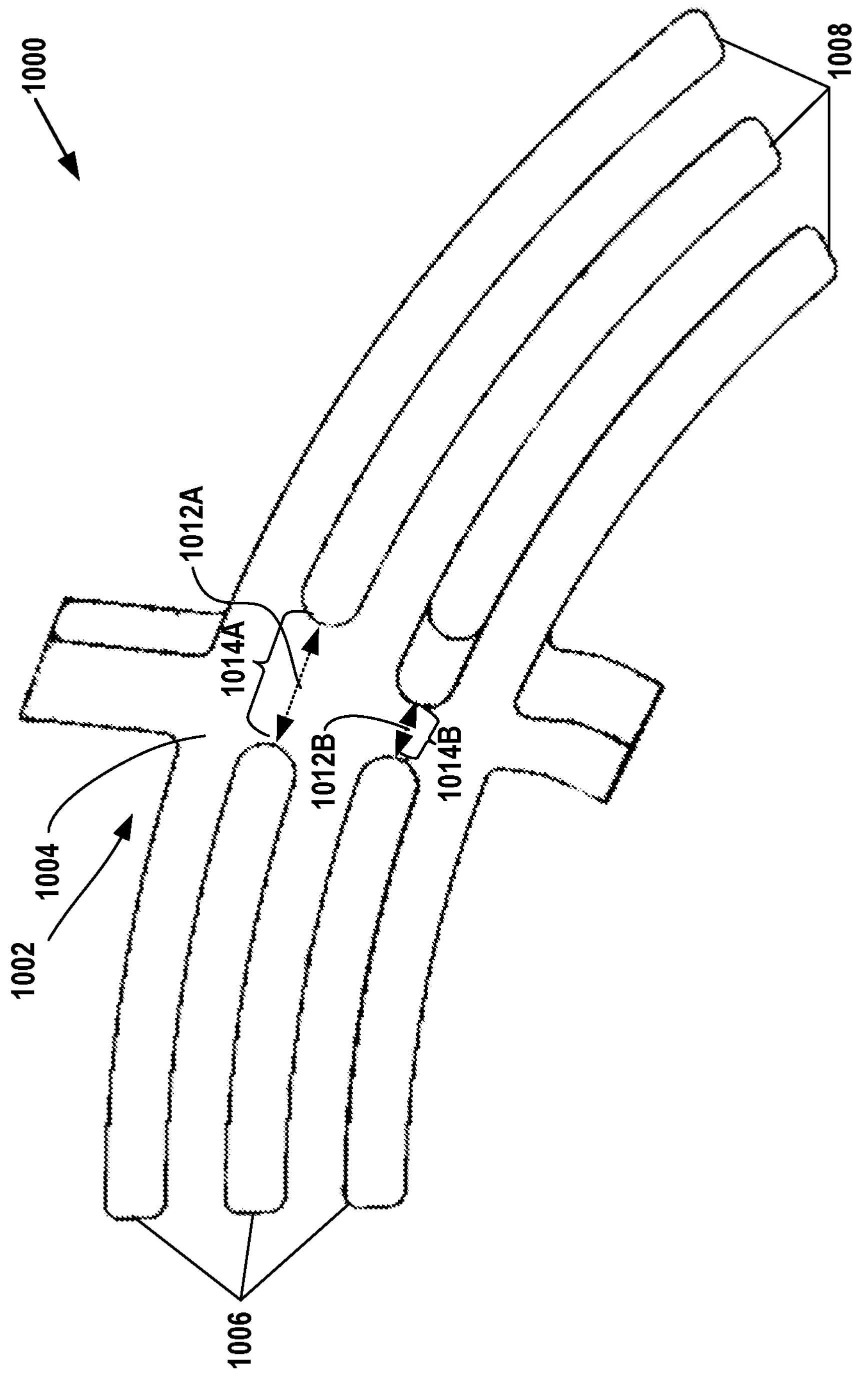
FIG. 10 is a conceptual diagram illustrating an example antenna in accordance with one or more aspects of this disclosure.

FIG. 10 is a conceptual diagram illustrating an example antenna 1000 in accordance with one or more aspects of this disclosure. Antenna 1000 is similar in shape and function to antennas 300 and 900 in many respects. For instance, antenna 1000 may include one or more antenna portions, of which only antenna portion 1002 is shown in FIG. 10. Antenna portion 1002 includes a body 1004 to which arms 1006, 1008 connect. Body 1004 may have different widths between different pairs of arms. For instance, a width 1012A may be different from a width 1012B. In examples where antenna 1000 has another antenna portion, widths between arms may be the same as or different from widths 1012A, 1012B. The sizes and dimensions of arms, as well as relative physical lengths of arms 1006, 1008 to body 1004, antenna portion 1002, or antenna 1000 as a whole may be the same as or similar to those described elsewhere in this disclosure, e.g., with respect to antennas 300, 900.

Thus, in the example of FIG. 10, body 1004 includes a first region 1014A between a first anterior arm of the first set of anterior arms 1006 and a first posterior arm of the first set of posterior arms 1008. Body 1004 includes a second region 1014B between a second anterior arm of the first set of anterior arms 1006 and a second posterior arm of the first set of posterior arms 1008. A width 1012A of the first region 1014A is different from a width 1012B of the second region 1014B.

In some examples, one or more holes are defined in body 1004A and 1004B. In other examples, such as the example of FIG. 10, no holes are defined in bodies 1004A, 1004B.

Figure 11:
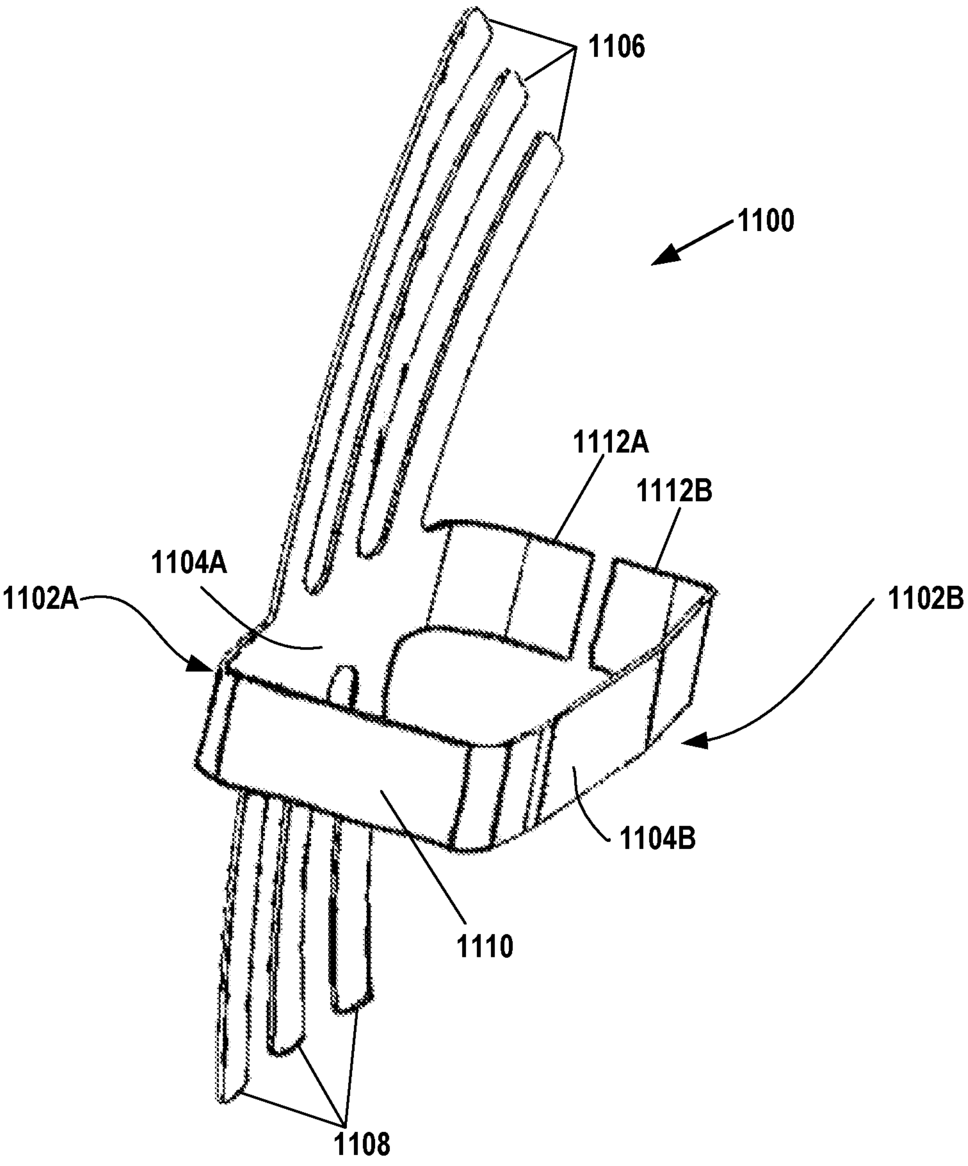
FIG. 11 is a conceptual diagram illustrating an example antenna in accordance with one or more aspects of this disclosure.

FIG. 11 is a conceptual diagram illustrating an example antenna 1100 in accordance with one or more aspects of this disclosure. Antenna 1110 is similar in some ways to antennas 300, 900, and 1000, except that only one antenna portion has arms. Specifically, antenna 1100 includes a first antenna portion 1102A and a second antenna portion 1102B. In some examples, antenna portion 1102A may be proximate a medial side of a hearing instrument (e.g., hearing instrument 102A, 102B). In other examples, antenna portion 1102A is proximate a lateral side of a hearing instrument (e.g., hearing instrument 102A, 102B).

Anterior arms 1106 and posterior arms 1108 extend from a body 1104A of antenna portion 1102A. A strap member 1110 connects antenna portion 1102A and antenna portion 1102B. In some examples, strap member 1110 connects superior edges of antenna portions 1102A, 1102B. In other examples, strap member 1110 connects inferior edges of antenna portions 1102A, 1102B. Like in FIG. 10, widths of regions of body 1104 may differ between corresponding pairs of anterior and posterior arms; or the widths of the regions of body 1104 between corresponding pairs of anterior and posterior arms may be the same.

Furthermore, antenna 1100 includes a first feed line 1112A and a second feed line 1112B (collectively, "feed lines 1112"). Feed line 1112A extends from an edge (e.g., a superior edge or an inferior edge) of antenna portion 1102A. Feed line 1112B extends from an edge (e.g., a superior edge or an inferior edge) of antenna portion 1102B. Feed lines 1112 may be radiating portions of antenna 300. Feed lines 1112 conduct electrical current to antenna portions 1102A, 1102B and a wireless transceiver (e.g., wireless transceiver 240). More specifically, feed lines 1112 may conduct electrical current to/from transmission conductors (e.g., transmission conductors 242) connected to the wireless transceiver. The transmission conductors may be a pair of conductors (e.g., wires, traces, etc.) extending from the wireless transceiver to feed lines 312. Thus, in some examples, the pair of transmission conductors may be considered a line that feeds an antenna that includes "feed lines 312." The transmission conductors themselves may or may not radiate.

Thus, in the example of FIG. 11, antenna 1100 includes a first antenna portion 1102A comprising a first body 1104A.

First antenna portion 1102A further comprises at least one of: a set of two or more anterior arms 1106 extending in an anterior direction from the first body 1104A. Each arm of the set of anterior arms 1106 may have a physical length at least 10% of a total physical length of the first antenna portion 1102A, or a set of two or more posterior arms 1108 extending in a posterior direction from first body 1104A. Each arm of the set of posterior arms 1108 may have a physical length at least 10% of a total physical length of the first antenna portion 1102A. A second antenna portion 1102B comprising a second body 1104B. First antenna portion 1102A and second antenna portion 1102B are configured to be on opposite sides of a hearing instrument (e.g., hearing instrument 102A or 102B). Strap member 1110 that connects a first edge (e.g., a superior or inferior edge) of first antenna portion 1102A to a first edge (e.g., a superior or inferior edge) of second antenna portion 1102B, A first feed line 1112A extends from a second edge of the first antenna portion 1102A. A second feed line 1112B extends from a second edge of the second antenna portion 1102B. In some examples, no arms extend from second antenna portion 1102B.

In some examples, one or more holes are defined in body 1104A and 1104B. In other examples, such as the example of FIG. 11, no holes are defined in bodies 1104A, 1104B.

Antennas 900, 1000, and 1100 may be manufactured in the same manner as described elsewhere in this disclosure with respect to antenna 300. Components of antennas 900, 1000, and 1100 may have the same or similar dimensions to corresponding components of antenna 300 described elsewhere in this disclosure.

The following is a non-limiting list of clauses in accordance with aspects of this disclosure.

Clause 1A. An antenna for a hearing instrument, the antenna comprising: a first antenna portion comprising a first body, wherein the first antenna portion further comprises at least one of: a first set of two or more anterior arms extending in an anterior direction from the first body, each arm of the first set of anterior arms having a physical length at least 10% of a total physical length of the first antenna portion, or a first set of two or more posterior arms extending in a posterior direction from the first body, each arm of the first set of posterior arms having a physical length at least 10% of a total physical length of the first antenna portion; a second antenna portion comprising a second body, wherein the second antenna portion further comprises at least one of: a second set of two or more anterior arms extending in the anterior direction from the second body, each arm of the second set of anterior arms having a physical length at least 10% of a total physical length of the second antenna portion, or a second set of two or more posterior arms extending in the posterior direction from the second body, each arm of the second set of posterior arms having a physical length at least 10% of a total physical length of the second antenna portion; a first feed line extending from a superior edge of the first antenna portion; and a second feed line extending from a superior edge of the second antenna portion.

Clause 2A. The antenna of clause 1A, wherein the first antenna portion is proximate a medial side of the hearing instrument and the second antenna portion is proximate a lateral side of the hearing instrument.

Clause 3A. The antenna of any of clauses 1A-2A, wherein, for at least one arm of the first set of anterior arms, the first set of posterior arms, the second set of anterior arms, or the second set of posterior arms: a distal end of the arm is subdivided into a plurality of sub-arms.

Clause 4A. The antenna of any of clauses 1A-3A, wherein the hearing instrument is a behind-the-ear hearing instrument or a receiver-in-canal hearing instrument.

Clause 5A. The antenna of any of clauses 1A-4A, wherein each arm of the first set of anterior arms, the first set of posterior arms, the second set of anterior arms, and/or the second set of posterior arms has the same width through their entire physical lengths excepting proximal and distal ends of the arm.

Clause 6A. The antenna of any of clauses 1A-5A, wherein spaces between the first set of anterior arms, spaces between the first set of posterior arms, spaces between the second set of anterior arms, and/or spaces between the second set of posterior arms each have physical lengths at least 10% of the total physical lengths of the first and second antenna portions.

Clause 7A. The antenna of clause 6A, wherein the first antenna portion comprises the first set of anterior arms and the first set of posterior arms, and a combined width of the first set of anterior arms and the spaces between the first set of anterior arms is equal to a combined width of the first set of posterior arms and the spaces between the first set of posterior arms.

Clause 8A. The antenna of any of clauses 1A-7A, wherein the first antenna portion comprises the first set of anterior arms and the first set of posterior arms, the second antenna portion comprises the second set of anterior arms and the second set of posterior arms, and there are the same number of arms in the first set of anterior arms and the first set of posterior arms, and there are the same number of arms in the second set of anterior arms and the second set of posterior arms.

Clause 9A. The antenna of clause 8A, wherein the first antenna portion comprises the first set of anterior arms and the first set of posterior arms, the second antenna portion comprises the second set of anterior arms and the second set of posterior arms, and each of the first set of anterior arms, the first set of posterior arms, the second set of anterior arms, and the second set of posterior arms consists of three arms.

Clause 10A. The antenna of any of clauses 1A-9A, wherein each of the first set of anterior arms, the first set of posterior arms, the second set of anterior arms, and/or the second set of posterior arms is arc shaped.

Clause 11A. The antenna of clause 10A, wherein: the first antenna portion comprises the first set of anterior arms and the first set of posterior arms, the first set of anterior arms includes a superior-anterior arm, a middle-anterior arm, and an inferior-anterior arm, the first set of posterior arms includes a superior-posterior arm, a middle-posterior arm, and an inferior-posterior arm, a curved line defined by a superior edge of the superior-anterior arm is continuous with a curved line defined by a superior edge of the superior-posterior arm, a curved line defined by an inferior edge of the superior-anterior arm is continuous with a curved line defined by an inferior edge of the superior-posterior arm, a curved line defined by a superior edge of the middle-anterior arm is continuous with a curved line defined by a superior edge of the middle-posterior arm, and a curved line defined by an inferior edge of the inferior-anterior arm is continuous with a curved line defined by an inferior edge of the inferior-posterior arm.

Clause 12A. The antenna of any of clauses 1A-11A, wherein: the first antenna portion comprises the first set of anterior arms and the first set of posterior arms, the first set of anterior arms includes a superior-anterior arm, a middle-anterior arm, and an inferior-anterior arm, the first set of posterior arms includes a superior-posterior arm, a middle-posterior arm, and an inferior-posterior arm, a width of the superior-anterior arm is approximately 0.039 inches, a width of the middle-anterior arm is approximately 0.032 inches, a width of the inferior-anterior arm is approximately 0.048 inches, a width of the superior-posterior arm is approximately 0.039 inches, a width of the middle-posterior arm is approximately 0.040 inches, and a width of the inferior-posterior arm is approximately 0.039 inches.

Clause 13A. The antenna of any of clauses 1A-12A, wherein: the first set of anterior arms includes a superior-anterior arm, a middle-anterior arm, and an inferior-anterior arm, the first set of posterior arms includes a superior-posterior arm, a middle-posterior arm, and an inferior-posterior arm, a total physical length of the antenna is 0.764 inches, a space between the superior-anterior arm and the middle-anterior arm has a physical length of approximately 0.406 inches, a space between the middle-anterior arm and the inferior-anterior arm has a physical length of approximately 0.331 inches as measured from a distal-most point of the inferior-anterior arm to the first body, a space between the superior-posterior arm and the middle-posterior arm has a physical length of approximately 0.274 inches, and a space between the middle-posterior arm and the inferior-posterior arm has a physical length of approximately 0.238 inches as measured from a distal-most point of the inferior-posterior arm to the first body.

Clause 14A. The antenna of any of clauses 1A-13A, wherein the antenna further comprises a strap member that connects inferior edges of the first antenna portion and the second antenna portion.

Clause 15. A hearing instrument comprising the antenna of any of clauses 1A-14A.

Clause 1B. An antenna for a hearing instrument, the antenna comprising: a first antenna portion comprising a first body, wherein the first antenna portion further comprises at least one of: a first set of two or more anterior arms extending in an anterior direction from the first body, each arm of the first set of anterior arms having a physical length at least 10% of a total physical length of the first antenna portion, or a first set of two or more posterior arms extending in a posterior direction from the first body, each arm of the first set of posterior arms having a physical length at least 10% of a total physical length of the first antenna portion; a second antenna portion comprising a second body, wherein the second antenna portion further comprises at least one of: a second set of two or more anterior arms extending in the anterior direction from the second body, each arm of the second set of anterior arms having a physical length at least 10% of a total physical length of the second antenna portion, or a second set of two or more posterior arms extending in the posterior direction from the second body, each arm of the second set of posterior arms having a physical length at least 10% of a total physical length of the second antenna portion; a first feed line extending from an edge of the first antenna portion; and a second feed line extending from an edge of the second antenna portion.

Clause 2B. The antenna of clause 1B, wherein the first antenna portion is proximate a medial side of the hearing instrument and the second antenna portion is proximate a lateral side of the hearing instrument.

Clause 3B. The antenna of any of clauses 1B-2B, wherein, for at least one arm of the first set of anterior arms, the first set of posterior arms, the second set of anterior arms, or the second set of posterior arms: a distal end of the arm is subdivided into a plurality of sub-arms.

Clause 4B. The antenna of any of clauses 1B-3B, wherein the hearing instrument is a behind-the-ear hearing instrument or a receiver-in-canal hearing instrument.

Clause 5B. The antenna of any of clauses 1B-4B, wherein each arm of the first set of anterior arms, the first set of posterior arms, the second set of anterior arms, and/or the second set of posterior arms has the same width through their entire physical lengths excepting proximal and distal ends of the arm.

Clause 6B. The antenna of any of clauses 1B-6B, wherein spaces between the first set of anterior arms, spaces between the first set of posterior arms, spaces between the second set of anterior arms, and/or spaces between the second set of posterior arms each have physical lengths at least 10% of the total physical lengths of the first and second antenna portions.

Clause 7B. The antenna of clause 6B, wherein the first antenna portion comprises the first set of anterior arms and the first set of posterior arms, and a combined width of the first set of anterior arms and the spaces between the first set of anterior arms is equal to a combined width of the first set of posterior arms and the spaces between the first set of posterior arms.

Clause 8B. The antenna of any of clause 1B-7B, wherein the first antenna portion comprises the first set of anterior arms and the first set of posterior arms, the second antenna portion comprises the second set of anterior arms and the second set of posterior arms, and there are the same number of arms in the first set of anterior arms and the first set of posterior arms, and there are the same number of arms in the second set of anterior arms and the second set of posterior arms.

Clause 9B. The antenna of clause 8B, wherein the first antenna portion comprises the first set of anterior arms and the first set of posterior arms, the second antenna portion comprises the second set of anterior arms and the second set of posterior arms, and each of the first set of anterior arms, the first set of posterior arms, the second set of anterior arms, and the second set of posterior arms consists of three arms.

Clause 10B. The antenna of any of clauses 1B-9B, wherein each of the first set of anterior arms, the first set of posterior arms, the second set of anterior arms, and/or the second set of posterior arms is arc shaped.

Clause 11B. The antenna of clause 10B, wherein: the first antenna portion comprises the first set of anterior arms and the first set of posterior arms, the first set of anterior arms includes a superior-anterior arm, a middle-anterior arm, and an inferior-anterior arm, the first set of posterior arms includes a superior-posterior arm, a middle-posterior arm, and an inferior-posterior arm, a curved line defined by a superior edge of the superior-anterior arm is continuous with a curved line defined by a superior edge of the superior-posterior arm, a curved line defined by an inferior edge of the superior-anterior arm is continuous with a curved line defined by an inferior edge of the superior-posterior arm, a curved line defined by a superior edge of the middle-anterior arm is continuous with a curved line defined by a superior edge of the middle-posterior arm, and a curved line defined by an inferior edge of the inferior-anterior arm is continuous with a curved line defined by an inferior edge of the inferior-posterior arm.

Clause 12B. The antenna of any of clauses 1B-11B, wherein: the first antenna portion comprises the first set of anterior arms and the first set of posterior arms, the first set of anterior arms includes a superior-anterior arm, a middle-anterior arm, and an inferior-anterior arm, the first set of posterior arms includes a superior-posterior arm, a middle-posterior arm, and an inferior-posterior arm, a width of the superior-anterior arm is approximately 0.039 inches, a width of the middle-anterior arm is approximately 0.032 inches, a width of the inferior-anterior arm is approximately 0.048 inches, a width of the superior-posterior arm is approximately 0.039 inches, a width of the middle-posterior arm is approximately 0.040 inches, and a width of the inferior-posterior arm is approximately 0.039 inches.

Clause 13B. The antenna of any of clauses 1B-12B, wherein: the first set of anterior arms includes a superior-anterior arm, a middle-anterior arm, and an inferior-anterior arm, the first set of posterior arms includes a superior-posterior arm, a middle-posterior arm, and an inferior-posterior arm, a total physical length of the antenna is 0.764 inches, a space between the superior-anterior arm and the middle-anterior arm has a physical length of approximately 0.406 inches, a space between the middle-anterior arm and the inferior-anterior arm has a physical length of approximately 0.331 inches as measured from a distal-most point of the inferior-anterior arm to the first body, a space between the superior-posterior arm and the middle-posterior arm has a physical length of approximately 0.274 inches, and a space between the middle-posterior arm and the inferior-posterior arm has a physical length of approximately 0.238 inches as measured from a distal-most point of the inferior-posterior arm to the first body.

Clause 14B. The antenna of any of clauses 1B-13B, wherein: the antenna further comprises a strap member that connects inferior edges of the first antenna portion and the second antenna portion, the first feed line extends from a superior edge of the first antenna portion, and the second feed line extends from a superior edge of the second antenna portion.

Clause 15B. The antenna of any of clauses 1B-13B, wherein: the antenna further comprises a strap member that connects superior edges of the first antenna portion and the second antenna portion, the first feed line extends from an inferior edge of the first antenna portion, and the second feed line extends from an inferior edge of the first antenna portion.

Clause 16B. The antenna of any of clauses 1B-15B, wherein: the first body includes a first region between a first anterior arm of the first set of anterior arms and a first posterior arm of the first set of posterior arms, the first body includes a second region between a second anterior arm of the first set of anterior arms and a second posterior arm of the first set of posterior arms, a width of the first region is different from a width of the second region.

Clause 17B. An antenna for a hearing instrument, the antenna comprising: a first antenna portion comprising a first body, wherein the first antenna portion further comprises at least one of: a set of two or more anterior arms extending in an anterior direction from the first body, each arm of the set of anterior arms having a physical length at least 10% of a total physical length of the first antenna portion, or a set of two or more posterior arms extending in a posterior direction from the first body, each arm of the set of posterior arms having a physical length at least 10% of a total physical length of the first antenna portion; a second antenna portion comprising a second body, wherein the first antenna portion and the second antenna portion are configured to be on opposite sides of the hearing instrument; a strap member that connects a first edge of the first antenna portion to a first edge of the second antenna portion; a first feed line extending from a second edge of the first antenna portion; and a second feed line extending from a second edge of the second antenna portion.

Clause 18B. The antenna of clause 17B, wherein no arms extend from the second antenna portion.

Clause 19B. A hearing instrument comprising: a wireless transceiver; and an antenna that comprises: a first antenna portion comprising a first body, wherein the first antenna portion further comprises at least one of: a first set of two or more anterior arms extending in an anterior direction from the first body, each arm of the first set of anterior arms having a physical length at least 10% of a total physical length of the first antenna portion, or a first set of two or more posterior arms extending in a posterior direction from the first body, each arm of the first set of posterior arms having a physical length at least 10% of a total physical length of the first antenna portion; a second antenna portion comprising a second body, wherein the second antenna portion further comprises at least one of: a second set of two or more anterior arms extending in the anterior direction from the second body, each arm of the second set of anterior arms having a physical length at least 10% of a total physical length of the second antenna portion, or a second set of two or more posterior arms extending in the posterior direction from the second body, each arm of the second set of posterior arms having a physical length at least 10% of a total physical length of the second antenna portion; a first feed line connected to the wireless transceiver and extending from an edge of the first antenna portion; and a second feed line connected to the wireless transceiver and extending from an edge of the second antenna portion.

Clause 20B. The hearing instrument of clause 19B, wherein: the antenna further comprises a strap member that connects superior edges of the first antenna portion and the second antenna portion, the first feed line extends from an inferior edge of the first antenna portion, and the second feed line extends from an inferior edge of the first antenna portion.

In this disclosure, ordinal terms such as "first," "second," "third," and so on, are not necessarily indicators of positions within an order, but rather may be used to distinguish different instances of the same thing. Examples provided in this disclosure may be used together, separately, or in various combinations. Furthermore, with respect to examples that involve personal data regarding a user, it may be required that such personal data only be used with the permission of the user.

It is to be recognized that depending on the example, certain acts or events of any of the features or techniques described herein can be created, assembled, or performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processing circuits to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, cache memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Functionality described in this disclosure may be performed by fixed function and/or programmable processing circuitry. For instance, instructions may be executed by fixed function and/or programmable processing circuitry. Such processing circuitry may include one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements. Processing circuits may be coupled to other components in various ways. For example, a processing circuit may be coupled to other components via an internal device interconnect, a wired or wireless network connection, or another communication medium.

The techniques of this disclosure may be implemented in a wide variety of devices or apparatuses, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

What is claimed is:

1. An antenna for a hearing instrument, the antenna comprising:

- a first antenna portion comprising a first body, wherein the first antenna portion further comprises:
  - a first set of two or more anterior arms extending in an anterior direction from the first body, each arm of the first set of anterior arms having a physical length at least 10% of a total physical length of the first antenna portion, and
  - a first set of two or more posterior arms extending in a posterior direction from the first body, each arm of the first set of posterior arms having a physical length at least 10% of the total physical length of the first antenna portion;
- a second antenna portion comprising a second body, wherein the second antenna portion further comprises:
  - a second set of two or more anterior arms extending in the anterior direction from the second body, each arm of the second set of anterior arms having a physical length at least 10% of a total physical length of the second antenna portion, and
  - a second set of two or more posterior arms extending in the posterior direction from the second body, each arm of the second set of posterior arms having a physical length at least 10% of the total physical length of the second antenna portion;
- a first feed line extending from an edge of the first antenna portion; and
- a second feed line extending from an edge of the second antenna portion, wherein each arm of the first set of anterior arms and each arm of the first set of posterior arms is arc-shaped, and wherein a curved line defined by a superior edge of an arm of the first set of anterior arms is continuous with a curved line defined by a superior edge of an arm of the first set of posterior arms.

2. The antenna of claim 1, wherein the first antenna portion is proximate a medial side of the hearing instrument and the second antenna portion is proximate a lateral side of the hearing instrument.

3. The antenna of claim 1, wherein, for at least one arm of the first set of anterior arms, the first set of posterior arms, the second set of anterior arms, or the second set of posterior arms: a distal end of the at least one arm is subdivided into a plurality of sub-arms.

4. The antenna of claim 1, wherein the hearing instrument is a behind-the-ear hearing instrument or a receiver-in-canal hearing instrument.

5. The antenna of claim 1, wherein each respective arm of the first set of anterior arms, the first set of posterior arms, the second set of anterior arms, and/or the second set of posterior arms has the same width through an entire physical length of the respective arm excepting proximal and distal ends of the respective arm.

6. The antenna of claim 1, wherein spaces between the first set of anterior arms, spaces between the first set of posterior arms, spaces between the second set of anterior arms, and/or spaces between the second set of posterior arms each have physical lengths at least 10% of the total physical lengths of the first and second antenna portions.

7. The antenna of claim 6, wherein the first antenna portion comprises the first set of anterior arms and the first set of posterior arms, and a combined width of the first set of anterior arms and the spaces between the first set of anterior arms is equal to a combined width of the first set of posterior arms and the spaces between the first set of posterior arms.

8. The antenna of claim 1, wherein the first antenna portion comprises the first set of anterior arms and the first set of posterior arms, the second antenna portion comprises the second set of anterior arms and the second set of posterior arms, and there are the same number of arms in the first set of anterior arms and the first set of posterior arms, and there are the same number of arms in the second set of anterior arms and the second set of posterior arms.

9. The antenna of claim 8, wherein the first antenna portion comprises the first set of anterior arms and the first set of posterior arms, the second antenna portion comprises the second set of anterior arms and the second set of posterior arms, and each of the first set of anterior arms, the first set of posterior arms, the second set of anterior arms, and the second set of posterior arms consists of three arms.

10. The antenna of claim 1, wherein each of the second set of anterior arms and/or the second set of posterior arms is arc-shaped.

11. The antenna of claim 1, wherein:
the curved line defined by the superior edge of the arm of the first set of anterior arms is a first curved line,
the curved line defined by the superior edge of the arm of the first set of posterior arms is a second curved line,
the arm of the first set of anterior arms is a superior-anterior arm,
the arm of the first set of posterior arms is a superior-posterior arm,
the first set of anterior arms includes the superior-anterior arm, a middle-anterior arm, and an inferior-anterior arm,
the first set of posterior arms includes the superior-posterior arm, a middle-posterior arm, and an inferior-posterior arm,
a third curved line defined by an inferior edge of the superior-anterior arm is continuous with a fourth curved line defined by an inferior edge of the superior-posterior arm,
a fifth curved line defined by a superior edge of the middle-anterior arm is continuous with a sixth curved line defined by a superior edge of the middle-posterior arm, and
a seventh curved line defined by an inferior edge of the inferior-anterior arm is continuous with an eighth curved line defined by an inferior edge of the inferior-posterior arm.

12. The antenna of claim 1, wherein:
the first set of anterior arms includes a superior-anterior arm, a middle-anterior arm, and an inferior-anterior arm, wherein the arm of the first set of anterior arms is one of the superior-anterior arm, the middle-anterior arm, or the inferior-anterior arm,
the first set of posterior arms includes a superior-posterior arm, a middle-posterior arm, and an inferior-posterior arm, wherein the arm of the first set of posterior arms is one of the superior-posterior arm, the middle-posterior arm, or the inferior-posterior arm,
a width of the superior-anterior arm is approximately 0.039 inches,
a width of the middle-anterior arm is approximately 0.032 inches,
a width of the inferior-anterior arm is approximately 0.048 inches,
a width of the superior-posterior arm is approximately 0.039 inches,
a width of the middle-posterior arm is approximately 0.040 inches, and
a width of the inferior-posterior arm is approximately 0.039 inches.

13. The antenna of claim 1, wherein:
the first set of anterior arms includes a superior-anterior arm, a middle-anterior arm, and an inferior-anterior arm, wherein the arm of the first set of anterior arms is one of the superior-anterior arm, the middle-anterior arm, or the inferior-anterior arm,
the first set of posterior arms includes a superior-posterior arm, a middle-posterior arm, and an inferior-posterior arm, wherein the arm of the first set of posterior arms is one of the superior-posterior arm, the middle-posterior arm, or the inferior-posterior arm,
a total physical length of the antenna is 0.764 inches,
a space between the superior-anterior arm and the middle-anterior arm has a physical length of approximately 0.406 inches,
a space between the middle-anterior arm and the inferior-anterior arm has a physical length of approximately 0.331 inches as measured from a distal-most point of the inferior-anterior arm to the first body,
a space between the superior-posterior arm and the middle-posterior arm has a physical length of approximately 0.274 inches, and
a space between the middle-posterior arm and the inferior-posterior arm has a physical length of approximately 0.238 inches as measured from a distal-most point of the inferior-posterior arm to the first body.

14. The antenna of claim 1, wherein:
the antenna further comprises a strap member that connects inferior edges of the first antenna portion and the second antenna portion,
the first feed line extends from a superior edge of the first antenna portion, and
the second feed line extends from a superior edge of the second antenna portion.

15. A hearing instrument comprising:
a wireless transceiver; and
an antenna that comprises:
a first antenna portion comprising a first body, wherein the first antenna portion further comprises:
a first set of two or more anterior arms extending in an anterior direction from the first body, each arm of the first set of anterior arms having a physical length at least 10% of a total physical length of the first antenna portion, and
a first set of two or more posterior arms extending in a posterior direction from the first body, each arm of the first set of posterior arms having a physical length at least 10% of the total physical length of the first antenna portion;
a second antenna portion comprising a second body, wherein the second antenna portion further comprises:
a second set of two or more anterior arms extending in the anterior direction from the second body, each arm of the second set of anterior arms having a physical length at least 10% of a total physical length of the second antenna portion, and
a second set of two or more posterior arms extending in the posterior direction from the second body, each arm of the second set of posterior arms having a physical length at least 10% of the total physical length of the second antenna portion;
a first feed line connected to the wireless transceiver and extending from an edge of the first antenna portion; and a second feed line connected to the wireless transceiver and extending from an edge of the second antenna portion, wherein each arm of the first set of anterior arms and each arm of the first set of posterior arms is arc-shaped, and wherein a curved line defined by a superior edge of an arm of the first set of anterior arms is continuous with a curved line defined by a superior edge of an arm of the first set of posterior arms.

16. The hearing instrument of claim 15, wherein:

the antenna further comprises a strap member that connects superior edges of the first antenna portion and the second antenna portion, the first feed line extends from an inferior edge of the first antenna portion, and the second feed line extends from an inferior edge of the first antenna portion.

* * * * *